(12) United States Patent
Murata et al.

(10) Patent No.: US 9,278,705 B2
(45) Date of Patent: Mar. 8, 2016

(54) INFORMATION PRESENTATION DEVICE USING TACTILE STIMULUS WITH VIBRATOR

(75) Inventors: Kazuhito Murata, Tokyo (JP); Hideo Mitsuhashi, Tokyo (JP); Shin Norieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 104 days.

(21) Appl. No.: 13/514,159

(22) PCT Filed: Dec. 7, 2010

(86) PCT No.: PCT/JP2010/071914
§ 371 (c)(1),
(2), (4) Date: Jun. 6, 2012

(87) PCT Pub. No.: WO2011/071044
PCT Pub. Date: Jun. 16, 2011

(65) Prior Publication Data
US 2012/0242465 A1 Sep. 27, 2012

(30) Foreign Application Priority Data

Dec. 8, 2009 (JP) .................................. 2009-278925
Jun. 29, 2010 (JP) .................................. 2010-147629

(51) Int. Cl.
*G08B 6/00* (2006.01)
*B62D 1/04* (2006.01)
*B60Q 9/00* (2006.01)
*G01C 21/36* (2006.01)

(52) U.S. Cl.
CPC .......... *B62D 1/046* (2013.01); *B60Q 9/00* (2013.01); *G01C 21/3664* (2013.01)

(58) Field of Classification Search
None
See application file for complete search history.

(56) References Cited

U.S. PATENT DOCUMENTS

| 5,767,796 | A | * | 6/1998 | Van Roekel et al. .......... 340/988 |
| 6,992,571 | B2 | * | 1/2006 | Ota et al. .................. 340/407.1 |
| 7,414,520 | B2 | | 8/2008 | Meissner |
| 2005/0021190 | A1 | | 1/2005 | Worrell et al. |
| 2006/0047386 | A1 | * | 3/2006 | Kanevsky et al. .............. 701/36 |

(Continued)

FOREIGN PATENT DOCUMENTS

| JP | 2005-132341 | 5/2005 |
| JP | 2006-226840 | 8/2006 |

(Continued)

OTHER PUBLICATIONS

International Search Report, PCT/JP2010/071914, Feb. 8, 2011.

*Primary Examiner* — Curtis King
(74) *Attorney, Agent, or Firm* — Young & Thompson

(57) ABSTRACT

An information presentation device transmits information of a car navigation system, installed in a vehicle, to a driver in form of tactile stimuli, wherein a controller controls a plurality of vibrators attached to a steering wheel. The vibrators are arranged in proximity to vibration transmitters, corresponding to holding parts of a steering wheel, so that they are controlled with desired vibration intensity and vibration start timing in response to drive signals from the controller. Two vibrators are arranged in the holding parts of a steering wheel which come in contact with driver's hands and are controlled to generate a virtual vibrating source, thus rendering a driver feeling a sensation as if a vibrating source is moving in upward-downward directions, left-right directions, and far-near directions in the front side of a driver. Thus, it is possible to present accurate information with a small amount of energy consumption in driving vibrators.

18 Claims, 14 Drawing Sheets

(56) References Cited

U.S. PATENT DOCUMENTS

| | | |
|---|---|---|
| 2006/0070795 A1 | 4/2006 | Meissner |
| 2007/0091063 A1* | 4/2007 | Nakamura et al. ............ 345/156 |
| 2008/0023254 A1* | 1/2008 | Prost-Fin et al. ............ 180/400 |
| 2008/0174415 A1 | 7/2008 | Tanida et al. |
| 2009/0212974 A1* | 8/2009 | Chiba et al. ................ 340/932.2 |
| 2010/0198458 A1* | 8/2010 | Buttolo et al. .................. 701/36 |

FOREIGN PATENT DOCUMENTS

| | | |
|---|---|---|
| JP | 2006-521954 | 9/2006 |
| JP | 2007-055561 | 3/2007 |
| JP | 2008-077631 | 4/2008 |
| JP | 2008-149844 | 7/2008 |
| JP | 2009-031946 | 2/2009 |

* cited by examiner

INFORMATION PRESENTATION DEVICE
USING TACTILE STIMULUS WITH
VIBRATOR

TECHNICAL FIELD

The present invention relates to an information presentation device using a tactile stimulus with a vibrator.

The present application claims priorities on Japanese Patent Application No. 2009-278925 (filing date: Dec. 8, 2009) and Japanese Patent Application No. 2010-147629 (filing date: Jun. 29, 2010), the entire contents of which are incorporated herein by reference.

BACKGROUND ART

Conventionally, information presentation devices presenting operators of vehicles with vehicle information using tactile stimuli have been known. PLT 1 disclosed an information presentation device including a plurality of vibrators attached to a vehicle's seat and a detector for detecting a moving direction of a moving body that exists in the periphery of a vehicle. Among a plurality of vibrators, the information presentation device sequentially drives at least two vibrators, which are related to the moving direction of a moving body detected by the detector, so as to present an operator with information of a moving body.

PLT 2 disclosed an information presentation device including a plurality of vibrators attached to a vehicle's seat and a detector for detecting a hazardous situation of a vehicle. Among a plurality of vibrators, the information presentation device selects two or more vibrators in response to a hazardous situation of a vehicle detected by the detector so as to drive those vibrators differently with respect to at least one of a vibration frequency, time, amplitude, and a vibration interval. Herein, it adjusts a vibration frequency, time, amplitude, and a vibration interval to tactile sensation characteristics of a human body such that a vehicle's operator can sense an apparent movement phenomenon, thus presenting the operator with alert information using a pattern representing a hazardous situation detected by the detector.

Additionally, the information presentation devices of PLT 1 and PLT 2 are each designed to arrange vibrators on the surface of a vehicle's seat and drive them so that tactile stimuli will be transmitted to the thigh and the back of a vehicle's operator.

CITATION LIST

Patent Literature

PLT 1: Japanese Patent Publication No. 2009-31946
PLT 2: Japanese Patent Publication No. 2008-77631

SUMMARY OF INVENTION

Technical Problem

The thigh and the back of a human body are regarded as areas with a relatively rarefactional distribution of organoleptic cells so that they exhibit a relatively low sensitivity to tactile stimuli in comparison with the palm of the hand and fingertips with a relatively dense distribution of organoleptic cells reacting to tactile stimuli. For this reason, the information presentation devices of PLT 1 and PLT 2 need to increase stimulus intensity to an operator by increasing vibrating intensity of vibrators in order to securely transmit information to a vehicle's operator, so that they are likely to increase the amount of energy consumed for driving vibrators.

Solution to Problem

The present invention is made in consideration of the foregoing circumstances, wherein the object thereof is to provide an information presentation device that is able to accurately transmit information to an operator with weak stimulus intensity transmitted to a vehicle's operator.

An information presentation device of the present invention presents an operator with externally provided information in form of vibration, wherein it includes a manual control part (e.g. a steering wheel) having a shape held by an operator's hand; at least one vibrator attached to the manual operation part; a controller that generates a driver signal to control the vibrator based on the externally provided information; and a vibration transmitter that transmits vibration of the vibrator, applied to the manual control part, as a tactile stimulus to an operator's hand.

It is possible to arrange a plurality of vibrators in the manual control part, wherein the controller is able to sequentially drive a plurality of vibrators with a time difference between their vibration start timings. In this case, the controller may generate a drive signal, based on a vibration transmission function established between the vibrator and the vibration transmitter in the manual control part, so as to control the vibrator. The controller may generate a drive signal rendering a frequency-modulated control waveform subjected to frequency sweep over a lapse of time. The controller may generate a drive signal rendering a control waveform multiplexing a plurality of frequency components and changing its mixing ratio with respect to time. The controller may control a plurality of vibrators with different values of vibration intensity. The controller may generate drive signals rendering amplitude-modulated control waveforms with a time-phase difference therebetween. The controller may generate drive signals rendering control waveforms with a discrete time difference, a time-phase difference, and an amplitude difference therebetween.

Advantageous Effects of Invention

An information presentation device of the present invention is designed to convert externally provided information into vibration using vibrators, thus transmitting tactile stimuli to an operator's hand holding a vibration transmitter. It is possible to accurately present information with weak tactile stimuli transmitted to an operator. Thus, it is possible to reduce the amount of energy consumed by the information presentation device.

DESCRIPTION OF EMBODIMENTS

The present invention will be described by way of embodiments with reference to the accompanying drawings. Herein, the same constituent elements are denoted using the same reference signs.

First Embodiment

Figure 1:
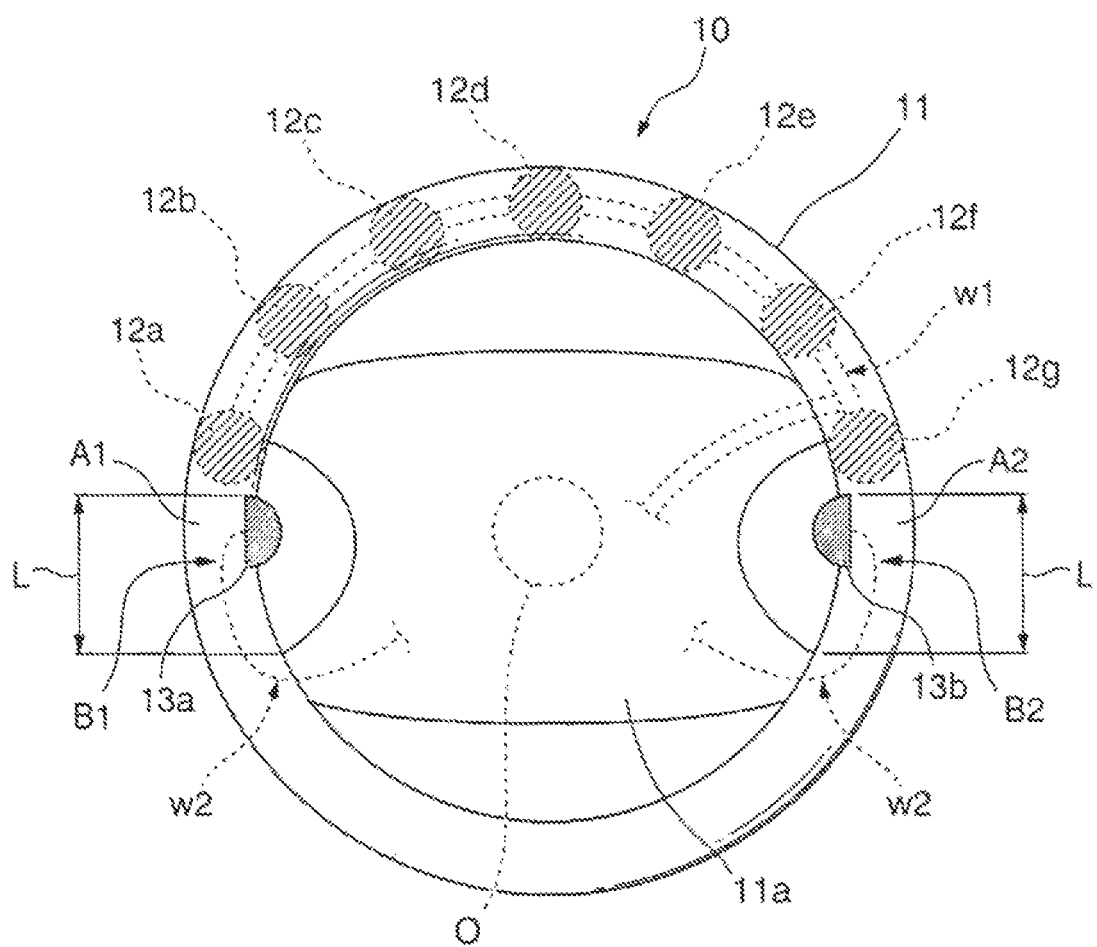
FIG. 1 A schematic illustration of an information presentation device according to a first embodiment of the present invention.
Figure 2:
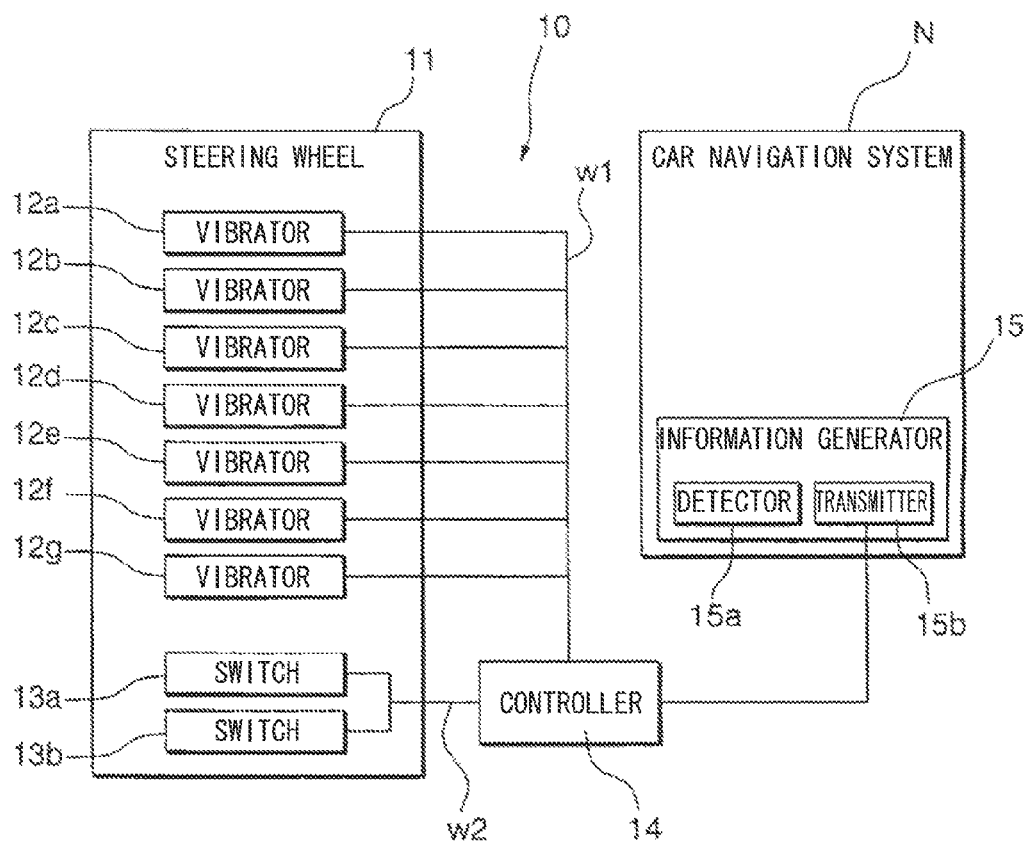
FIG. 2 A block diagram showing the constitution of the information presentation device of the first embodiment in connection with Usage 1 and Usage 2.

FIG. 1 is a schematic illustration of an information presentation device 10 according to a first embodiment of the present invention. FIG. 2 is a block diagram showing the constitution of the information presentation device 10.

The information presentation device 10 includes a steering wheel 11, seven vibrators 12 (i.e. vibrators 12*a* to 12*g*), switches 13*a*, 13*b*, and a controller 14. As shown in FIG. 2, the information presentation device 10 is connected to an information generator 15 installed in a car navigation system N.

The steering wheel 11 is attached to a driver's seat of a vehicle such as an automobile and driven by an operator to steer the vehicle. The external shape of the steering wheel 11 is a ring shape (or an oval shape) such that the ringed portion thereof is fixed to a steering center 11*a* disposed at a center position. The steering center 11*a* is fixed to a rotary shaft member O equipped with a steering mechanism for steering a vehicle. As a material for use in the steering wheel 11, for example, it is possible to employ a resin material, a metal, wood, and a carbon material. Alternatively, it is possible to produce the steering wheel 11 adequately combining a plurality of materials.

It is preferable that a vibration transmission function inherently ascribed to the material of the steering wheel 11 can be found by way of measurement or simulation; hence, it is preferable to employ the steering wheel 11 whose vibration transmission characteristic can be predicted in advance.

The steering wheel 11 includes two holding parts A1, A2 that can be held by an operator. It is preferable that the holding parts A1, A2 be positioned at opposite ends in left/right directions in view of an operator situated in front of the steering wheel 11 which is set to a neutral position (i.e. the position at which the steering wheel 11 is not steered in either direction about the rotary shaft member O). Additionally, it is preferable that the holding members A1, A2 be each shaped with a predetermined length L (e.g. an average of the maximum width of an adult's hand), measuring the maximum width of an operator's hand, extended in a circumferential direction of the steering wheel 11.

The holding parts A1, A2 of the steering wheel 11 are equipped with vibration transmitters B1, B2 which are able to transmit vibration, caused by the vibrators 12*a* to 12*g*, to an operator who is holding the holding parts A1, A2. In the first embodiment, the vibration transmitters B1, B2 are integrally formed with the steering wheel 11 by use of the same material as the material of the steering wheel 11.

In this connection, the vibration transmitters B1, B2 may form a part of the steering wheel 11; alternatively, they may be formed using material different from the material of the steering wheel 11.

The vibrators 12*a* to 12*g* are arranged in one arc portion, sandwiched between the holding parts A1, A2, in the ringed portion of the steering wheel 11, wherein they are disposed with equal intervals therebetween in the order of the vibrators 12*a*, 12*b*, 12*c*, 12*d*, 12*e*, 12*f*, and 12*g*.

When observing the steering wheel 11 in a front view from an operator, the first embodiment arranges the vibrators 12*a* to 12*g* in the upper arc portion of the steering wheel 11. Additionally, the vibrators 12*a* to 12*g* are embedded inside the upper arc portion of the steering wheel 11. Moreover, it is possible to employ an appropriate shape as the shape of the vibrators 12*a* to 12*g* as long as they can be embedded inside the steering wheel 11 without projecting from its external surface.

The vibrators 12*a* to 12*g* are connected to a signal wire W1 embedded inside the steering wheel 11. The signal wire W1 is connected to a controller 14. The controller 14 sends drive signals to the vibrators 12*a* to 12*g* via the signal wire W1.

The vibrators 12*a* to 12*g* are ones that vibrate themselves upon receiving drive signals from the controller 14; specifically, it is possible to employ vibration motors which are driven to rotate when a DC voltage is applied to them. Since vibrators 12*a* to 12*g* are embedded in the steering wheel 11, vibration caused by the vibrators 12*a* to 12*g* vibrating themselves is transmitted to the steering wheel 11 so that vibration is further transmitted to the vibration transmitters B1, B2 of the steering wheel 11.

The switches 13*a*, 13*b* are input parts which allow an operator (e.g. a driver) of a vehicle to operate predetermined devices; for example, it is possible to employ momentary switches. In the first embodiment, the switches 13*a*, 13*b* are positioned at the holding parts A1, A2 of the steering wheel 11 such that they are positioned oppositely to face each other across the rotary shaft member O. The switches 13*a*, 13*b* may be necessarily arranged within the reachable range in which a driver holding the holding parts A1, A2 of the steering wheel 11 can reach with his/her fingers. Thus, it is possible to arrange the switches 13A, 13B in proximity to the holding parts A1, A2.

The switches 13*a*, 13*b* are fixed to the steering wheel 11 such that they are projected inwardly from the inner circumference on the external surface of the steering wheel 11. This makes it possible for a driver to easily grope and hold the positions of the switches 13a, 13b. Additionally, the projecting direction of the switches 13a, 13b is an inward direction from the ringed portion of the steering wheel 11. Thus, an operator is able to easily press and operate the switches 13a, 13b while holding the holding parts A1, A2 of the steering wheel 11.

As a fixing method of the switches 13a, 13b to the steering wheel 11, it is preferable to employ a screw method or an integral molding method which prevents the switches 13a, 13b from being easily detached from the steering wheel 11. As another fixing method of the switches 13a, 13b to the steering wheel 11, for example, it is possible to fix them in a freely detachable manner using a plane fastener.

The switches 13a, 13b are connected to a signal wire W2 embedded inside the steering wheel 11. The signal wire W2 is connected to the controller 14, so that an input signal produced by the switches 13a, 13b is transmitted to the controller 14 via the signal wire W2.

Upon receiving information transmitted from the information generator 15, the controller 14 generates drive signals, used for driving the vibrators 12a to 12g, to the vibrators 12a to 12g. The controller 14 is connected to the information generator 15 and the vibrators 12a to 12g as well. In this connection, the information generator 15 may perform wireless communication with the controller 14.

In the first embodiment, the controller applies a DC current (or a drive signal), which is used to drive vibration motors, configuring the vibrators 12a to 12g, to rotate, to the vibrators 12a to 12g via the signal wire W1. The controller 14 generates a drive signal such that a driver can recognize vibration intensity and vibration time via his/her hands and fingers touching the vibration transmitters B1, B2. Additionally, the controller 14 sets a time duration to its drive signal such that the vibrators 12a to 12g are individually driven to vibrate for a certain time or they are sequentially driven to vibrate.

The information generator 15 includes a detector 15a that monitors and detects the operating states of devices installed in a vehicle and a transmitter 15b that transmits information, which needs to be presented to a driver among the operating states of devices detected by the detector 15a, to the controller 14.

Next, the operation of the information presentation device 10 of the first embodiment, which is installed in a vehicle such as an automobile, will be described. Herein, the following description refers to Usage 1 to Usage 3 of the information presentation device 10.

(Usage 1)

The information presentation device 10 of the first embodiment will be described in terms of Usage 1 with reference to FIGS. 1 and 2. In Usage 1, the information presentation device 10 is installed in a vehicle in connection with the car navigation device N that guides a vehicle to its destination.

First, it is assumed that a driver drives a vehicle while holding the holding parts A1, A2 of the steering wheel 11 with his/her both hands. A driver holding the holding parts A1, A2 may as well touches the vibration transmitters B1, B2 with his/her hands since the vibration transmitters B1, B2 are positioned at the holding parts A1, A2 of the steering wheel 11.

For the sake of safety steering of a vehicle, it is not preferable for an operator to disengage his/her hands from the steering wheel 11. Additionally, an operator needs to focus his/her sight and audition on driving a vehicle in order to confirm the external circumstances regarding the front view, the left/right views, and the rear view in a running direction of a vehicle.

It is possible to assume various situations in which information is presented to an operator while driving a vehicle. For example, there is a situation in which a running direction of a vehicle is presented to an operator in order to guide a vehicle to its destination in connection with the operation of the car navigation system N. The first embodiment incorporates the function of the information generator 15 into the car navigation system N to cope with this situation, so that the information generator 15 transmits information, which is used to present a running direction of a vehicle to an operator, to the controller 14. For example, this information is data indicating one of two directions, i.e. leftward and rightward directions dividing a running direction of a vehicle.

The controller 14 selects a vibrator, which needs to be driven, from among the vibrators 12a to 12g in response to information presented to a driver, so that it sends a drive signal to a single vibrator 12 which is selected. When a leftward direction is presented to an operator as a running direction of a vehicle, for example, the controller 14 selects a left-side vibrator 12a disposed close to the left-side holding part A1, thus sending a drive signal, which has a predetermined applied time in response to a vibrating time and an applied voltage for driving its vibration motor, to the vibrator 12a. That is, a relatively intense tactile stimulus is transmitted to a driver's left hand while a relatively weak tactile stimulus is transmitted to a driver's right hand. Thus, it is possible to present a driver with information indicating a leftward direction as a direction in which a vehicle should be running.

As described above, it is possible to present a driver with information directing a running direction of a vehicle via a tactile stimulus applied to a driver's hand holding the steering wheel 11 as well as visual information such as a map displayed on a screen of the car navigation system N and audio information such as audio guidance. As a result, a driver is able to recognize information of the car navigation system N without turning his/her eyes away from the front direction of a vehicle.

(Usage 2)

Next, Usage 2 for presenting a driver with information of the car navigation system N will be described with reference to FIGS. 1 and 2.

In Usage 2, the vibrators 12a to 12g are sequentially driven with different vibration start times applied to the vibrators 12a to 12g so as to present a running direction of a vehicle to a driver. In this case, the controller 14 receives data, indicating a running direction of a vehicle, from the car navigation system N so as to generate and send drive signals to the vibrators 12a to 12g such that their vibration start times are delayed in the order of the vibrators 12a, 12b, 12c, 12d, 12e, 12f, and 12g.

In the above case, the vibration transmitters B1, B2 transmit tactile stimuli to driver's hands holding the holding parts A1, A2 of the steering wheel 11 such that a driver may sense a vibrating source moving in a rightward direction from the holding part A1 to the holding part A2 in a driver's view. Thus, it is possible to present a driver with information indicating a rightward direction as a running direction of a vehicle by way of tactile stimuli.

Contrary to the above case, when the controller 14 sends drive signals indicating the vibration start times which are delayed in the order of the vibrators 12g, 12f, 12e, 12d, 12c, 12b, and 12a, the vibration transmitters B1, B2 transmit tactile stimuli to driver's hands holding the holding parts A1, A2 of the steering wheel 11 such that a driver may sense a vibrating source moving in a leftward direction from the holding part A2 to the holding part A1 in a driver's view. Thus, it is possible to present a driver with information indicating a leftward direction as a running direction of a vehicle by way of tactile stimuli.

(Usage 3)

Figure 3:
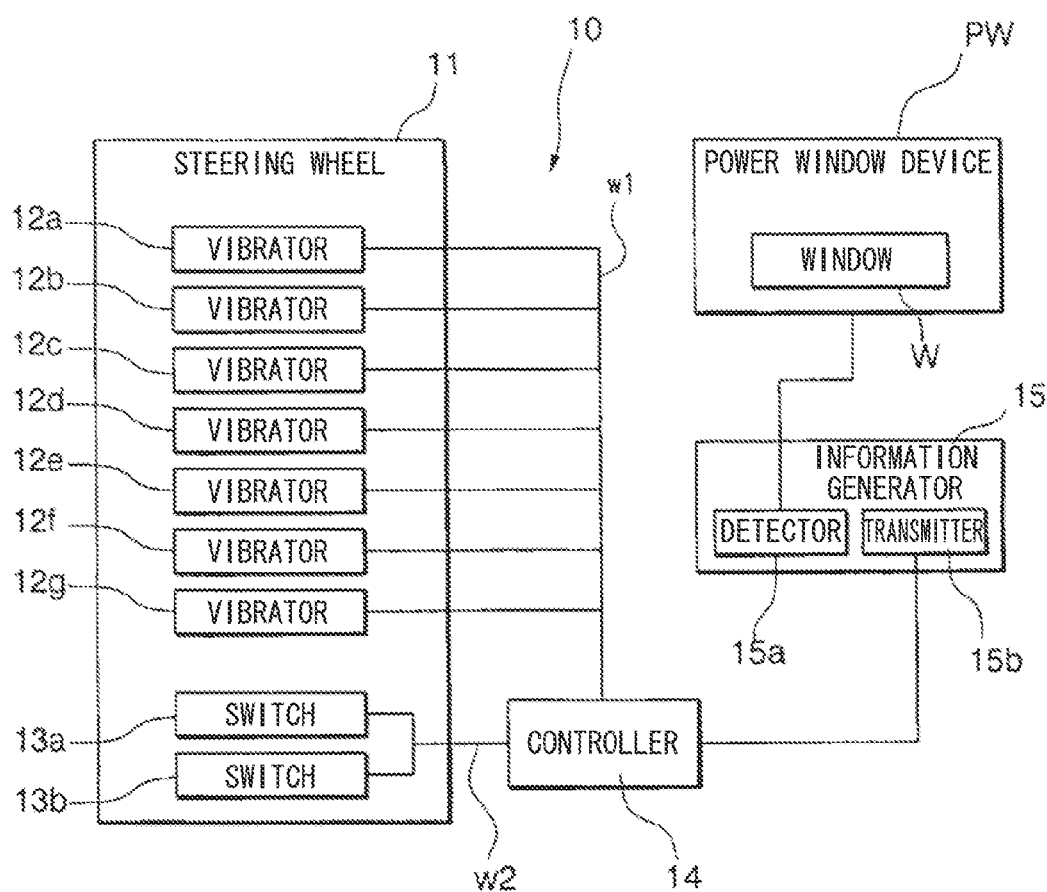
FIG. 3 A block diagram showing the constitution of the information presentation device of the first embodiment in connection with Usage 3.

Next, Usage 3 of the information presentation device of the first embodiment will be described with reference to FIGS. 1 to 3. FIG. 3 is a block diagram of the constitution of the information presentation device 10 according to Usage 3. Herein, Usage 3 differs from Usage 1 and Usage 2 in that it presents a driver with information from another device other than the car navigation device N. Herein, it presents an open/close position to a driver who operates a window W, at a driver's seat of a vehicle, to open or close by use of the switches 13a, 13b.

As shown in FIG. 3, the switch 13a is assigned as a close switch for closing the window W while the switch 13b is assigned as an open switch for opening the window W in Usage 3. That is, a power window device PW is driven using the switches 13a, 13b to open or close the window W.

The window W is closing when a driver presses the switch 13a. To the contrary, the window W is opening when a driver presses the switch 13b. The window W stops its movement when a driver disengages his/her fingers from the switches 13a, 13b.

In the information generator 15, the detector 15a detects an open/close position of the window W so that the transmitter 15b sends data, representing the open/close position of the window W, to the controller 14.

In Usage 3, the open/close position of the window W is digitized so that its opening degree increases in an order from "0" to "6". That is, "0" is set to the fully closed state of the window W while "6" is set to the fully opened state of the window W. Among seven values "0" to "6", one value is selectively set to data representing the open/close position of the window W.

The controller 14 receives data transmitted from the information generator 15 so as to select one of the seven vibrators 12a to 12g, thus sending a drive signal to the selected vibrator 12. In the controller 14, data values 0, 1, 2, 3, 4, 5, 6 are respectively correlated to the vibrators 12a, 12b, 12c, 12d, 12e, 12f, 12g in turn.

The vibrator 12a solely vibrating itself indicates the fully closed state of the window W whilst the vibrator 12g solely vibrating itself indicates the full opened state of the window W. The vibrator 12d solely vibrating itself indicates a half closed (or half opened) state of the window W. Additionally, the vibrator 12b or 12c solely vibrating itself indicates the state of the window W which is closed halfway or more but not fully closed. Moreover, the vibrator 12e or 12f solely vibrating itself indicates the state of the window W which is opened halfway or more but not fully opened.

In the half opened state (or the half closed state) of the window W, for example, the information generator 15 selects "3" from among data values 0 to 6 so as to send it to the controller 14. In response to the received data value "3", the controller 14 generates a drive signal, used for driving the vibrator 12d to vibrate, and send it to the vibrator 12d. Thus, the vibrator 12d is driven to vibrate so that its vibration propagates through the steering wheel 11 to reach the vibration transmitters B1, B2, from which it is transmitted to a driver's hands.

Due to vibration transmitted by the vibration transmitters B1, B2, a driver is able to sense vibration which occurs around the center of the upper arc portion of the steering wheel 11. Thus, a driver is able to recognize the half opened state of the window W with his/her tactile stimuli. A driver does not need to disengage his/her hands from the steering wheel 11 while driving a vehicle since the steering wheel 11 is equipped with both the vibrators 12a to 12g and the switches 13a, 13b.

In this connection, engine vibration and running vibration of a vehicle concurrently propagate to the steering wheel 11. However, human's hands have a relatively dense distribution of organoleptic cells reacting to tactile stimuli so as to exhibit a relatively high sensitivity to tactile stimuli, so that a driver is able to discriminate vibration of the vibrators 12a to 12g from normal vibration such as engine vibration and running vibration of a vehicle.

When a driver presses the switch 13b so as to further open the window W which has been already opened halfway, the information generator 15 sequentially send data values 4, 5, 6 to the controller 14, so that the controller 14 sends drive signals to sequentially vibrate the vibrators 12e, 12f, 12g in response to the received data values. The controller 14 sets time durations to its driver signals to individually vibrate the vibrators 12e, 12f, 12g, so that a vibrating position is changed in order among the vibrators 12e to 12g in connection with an open/closed position of the window W.

Due to the vibration position which is changing, a driver is able to sense an apparent movement phenomenon in which a vibrating source may move from the center of the upper arc portion of the steering wheel 11 toward the holding part A2. Thus, the information presentation device 10 transmits information, indicating an opening operation of the window W, to a driver's hands with tactile stimuli via the vibration transmitters B1, B2.

In this connection, when a driver presses the switch 13a to further close the window W which has been already opened halfway, the vibrators 12c, 12b, 12a are sequentially driven to vibrate. Thus, a driver is able to sense an apparent movement phenomenon in which a vibrating source may move from the center of the upper arc of the steering wheel 11 toward the holding part A1. That is, the information presentation device 10 transmits information, indicating a closing direction of the window W, to driver's hands with tactile stimuli via the vibration transmitters B1, B2.

The information presentation device of the first embodiment selectively drives a single vibrator to vibrate among a plurality of vibrators 12a to 12g, disposed along the ringed portion of the steering wheel 11, thus transmitting information, generated by the information generator 15, to driver's hands. Compared to the conventional art which transmits tactile stimuli to the thigh and the back of a driver, the information presentation device 10 of the first embodiment is able to accurately present information to a driver with weak stimulus intensity. Thus, it is possible to reduce the amount of energy consumed by the information presentation device 10.

Additionally, it is possible to apply vibration of the vibrators 12a to 12g to a driver who is holding the holding parts A1, A2 with his/her hands because the vibration transmitters B1, B2 are positioned at the holding parts A1, A2 of the steering wheel 11. Therefore, a driver is able to sense information without disengaging his/her hands from the steering wheel 11 and without turning his/her eyes off from the front direction of a vehicle.

Moreover, the steering wheel 11 is equipped with the holding parts A1, A2 at two positions while the steering wheel 11 is equipped with the seven vibrators 12a to 12g embedded therein, so that a driver is able to sense an apparent movement phenomenon in which a vibrating source may be moving when a plurality of vibrators 12 is sequentially driven to vibrate with time differences among their vibration start timings.

The steering wheel 11 is equipped with the switches 13a, 13b to open or close the window W, so that a driver is able to operate the window W without disengaging his/her hands from the steering wheel 11. At this time, a driver is informed of an open/close position of the window W by means of the vibration transmitters B1, B2 installed in the steering wheel 11, so that a driver is able to sense the operating state and the open/close position of the window W without disengaging his/her hands from the steering wheel 11 and without turning his/her eyes to the window W.

Since the vibrators 12a to 12g are embedded inside the steering wheel 11, a driver does not need to recognize the presence of the vibrators 12a to 12g unless the vibrators 12a to 12g are driven to vibrate even when driver's hands are touching the steering wheel 11. That is, a driver does not feel a sense of incongruity with his/her hands which are currently holding certain positions, other than the holding parts A1, A2, in the steering wheel 11 embedding the vibrators 12a to 12g therein.

Second Embodiment

Figure 4:
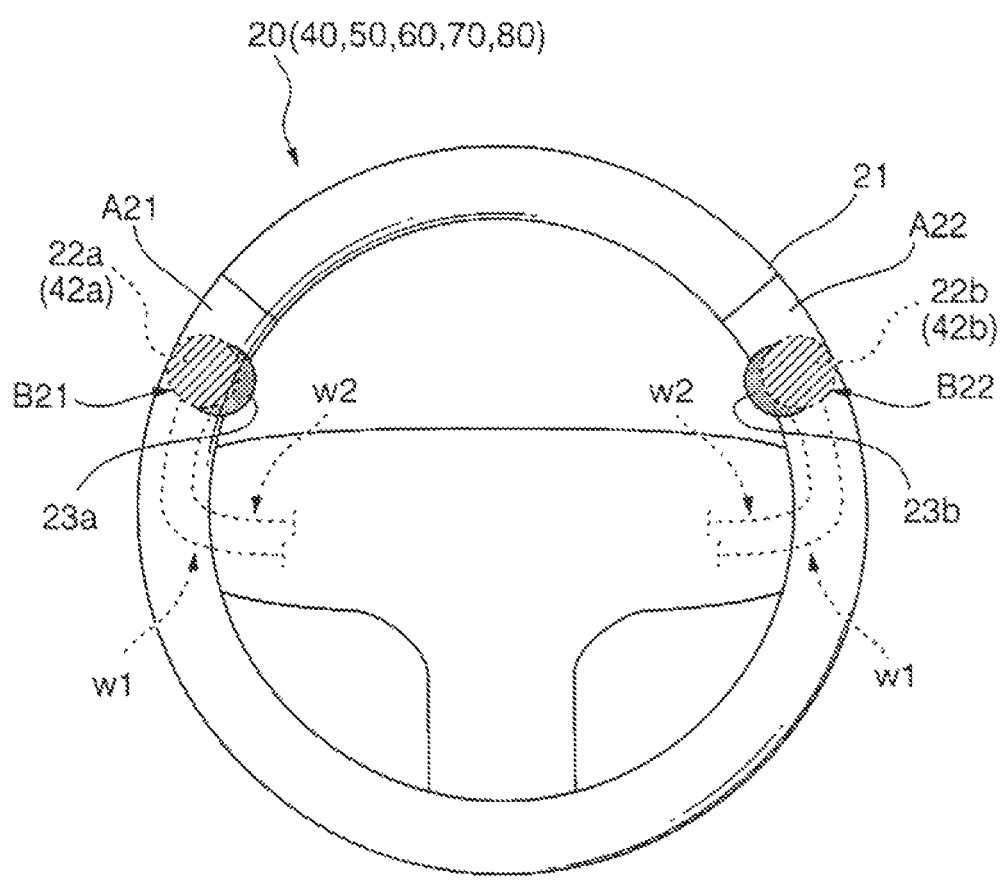
FIG. 4 A schematic illustration of an information presentation device according to a second embodiment of the present invention.
Figure 5:
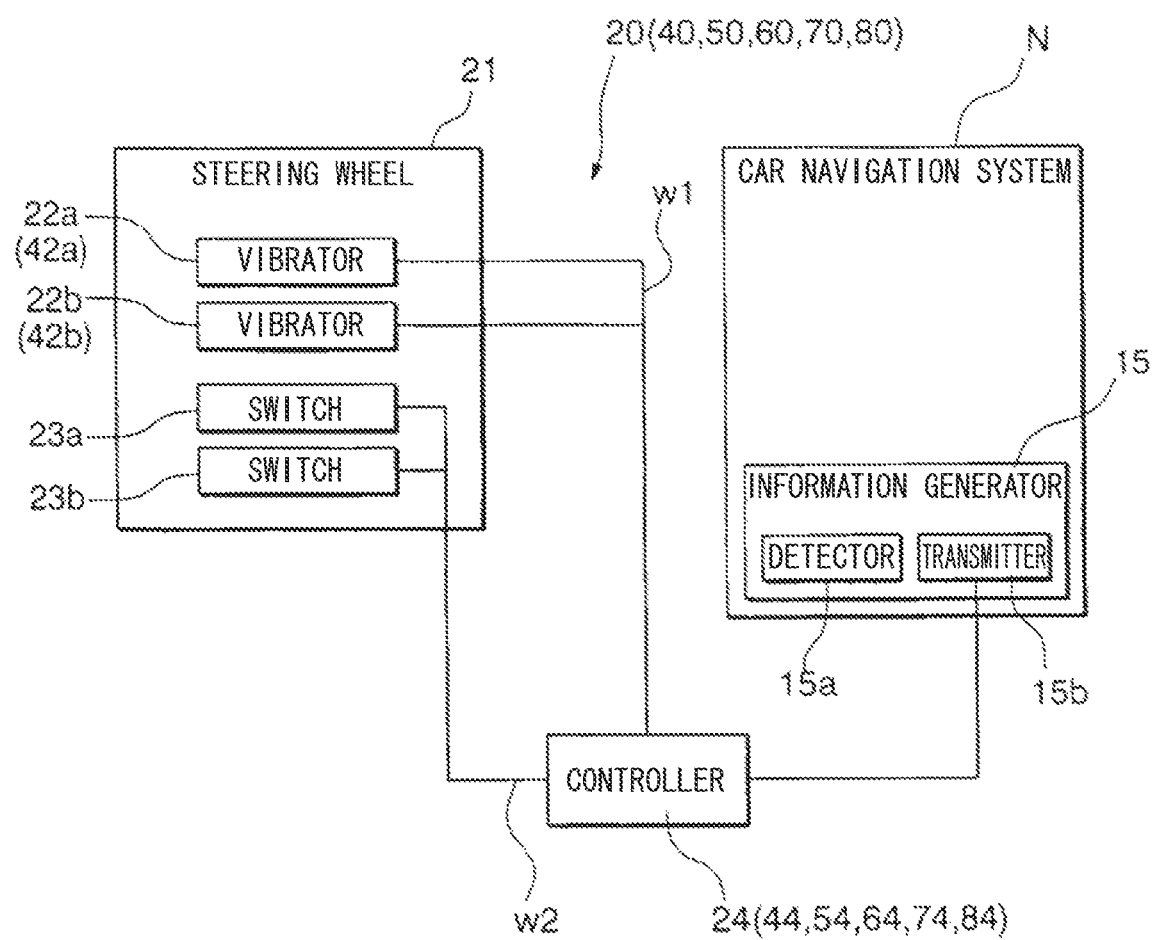
FIG. 5 A block diagram showing the constitution of the information presentation device of the second embodiment in connection with Usage 1.

Next, an information presentation device 20 according to a second embodiment of the present invention will be described. FIG. 4 is a schematic illustration of the information presentation device 20. FIG. 5 is a block diagram showing the constitution of the information presentation device 20.

As shown in FIGS. 4 and 5, the information presentation device 20 of the second embodiment differs from the information presentation device 10 of the first embodiment in terms of the number and the positions of vibrators as well as the positions of switches.

The first embodiment furnishes the steering wheel 11 with the vibrators 12a to 12g and the switches 13a, 13b. In contrast, the second embodiment furnishes a steering wheel 21 with vibrators 22a, 22b and switches 23a, 23b.

Similar to the steering wheel 11 of the first embodiment, the steering wheel 21 has a ring-shaped external configuration, with which a vehicle is steered depending on a driver's operation. Additionally, in view of a driver who sits in front of the steering wheel 21, holding parts A21, A22 are formed at left and right positions in the upper side of the steering wheel 21 just above its center portion. The positions of the holding parts A21, A22 of the steering wheel 21 match with ideal positions for a driver holding the steering wheel 21, i.e. 10 o'clock 10 minutes of a twelve-hour clock.

Additionally, the holding parts A21, A22 are furnished with vibration transmitters B21, B22 that transmit vibration, propagating from the vibrators 22a, 22b, to a driver's hands.

The vibrators 22a, 22b are respectively attached to the left and right positions in the upper side of the steering wheel 21 just above its center portion, in view of a driver who sits in front of the steering wheel 21, wherein these positions should preferably match with 10 o'clock 10 minutes of a twelve-hour clock.

Similar to the vibrators 12a to 12g embedded in the steering wheel 11 of the first embodiment, the vibrators 22a, 22b are embedded in the steering wheel 21 of the second embodiment and connected to a controller 24 via a signal wire W1. Similar to the vibrators 12a to 12g of the first embodiment, it is possible to employ vibration motors as the vibrators 22a, 22b.

The switches 23a, 23b are not entirely embedded in the steering wheel 21, but as similar to the switches 13a, 13b of the first embodiment, the switches 23a, 23b are fixed to the steering wheel 21 such that they are projecting inwardly from the internal circumference of the ringed portion of the steering wheel 21.

Additionally, the switches 23a, 23b are positioned at the right and left positions in the upper side of the steering wheel 21 just above its center portion, in view of a drive situated in front of the steering wheel 21, in proximity to the vibrators 22a, 22b, wherein these positions should preferably match with 10 o'clock 10 minutes of a twelve-hour clock. Similar to the switches 13a, 13b of the first embodiment, it is possible to employ momentary switches as the switches 23a, 23b.

Figure 6:
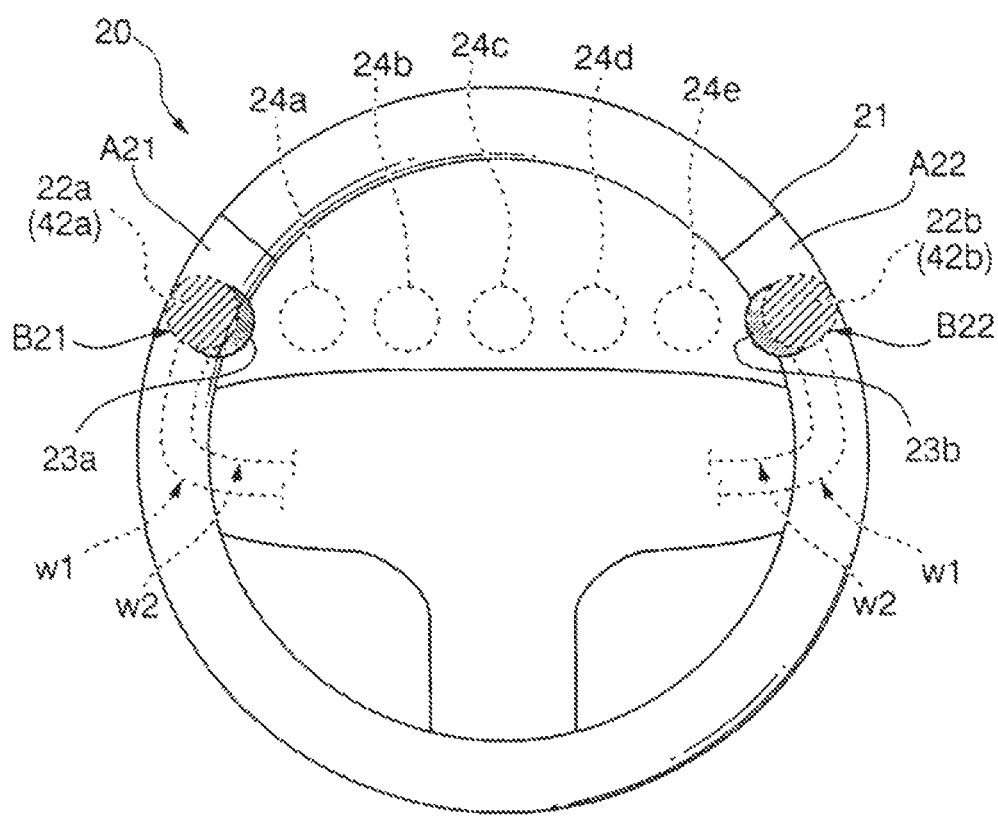
FIG. 6 A schematic illustration illustrating the operation and the instruction of the information presentation device of the second embodiment.

Next, the operation and the usage of the information presentation device 20 of the second embodiment will be described. FIG. 6 is a schematic illustration illustrating the operation of the information presentation device 20.

The information presentation device 20 of the second embodiment drives vibrators 22a, 22b to vary their vibration intensity so as to generate a virtual vibrating source 24 (i.e. virtual vibrating sources 24a, 24b, 24c, 24d, 24e), thus transmitting vibration to driver's hands holding the steering wheel 21. When the vibrators 22a, 22b are driven with the same vibration intensity, for example, a drive will be able to sense vibration of the vibrator 24c, corresponding to an intermediate position between the vibrators 22a and 22b, with his/her hands. Alternatively, when either the vibrator 22a or 22b is varied in its vibration intensity so as to cause a difference of vibration intensity therebetween, a driver will be able to sense a vibrating source moving toward a vibration with higher vibration intensity.

As the vibration intensity of the vibrator 22a is gradually increased to be higher than the vibration intensity of the vibrator 22b in the initial condition where the vibrators 22a, 22b are vibrating with the same vibration intensity, a driver will be able to sense a vibrating source whose position is moving from the holding part A22 to the holding part A21 in the order of the virtual vibrating sources 24c, 24b, and 24a. Contrarily, as the vibration intensity of the vibrator 22b is gradually increased to be higher than the vibration intensity of the vibrator 22a in the initial condition where the vibrators 22a, 22b are vibrating with the same vibration intensity, a driver will be able to sense a vibrating source whose position is moving from the holding part A21 to the holding part A22 in the order of the virtual vibrating sources 24c, 24d, and 24e.

(Usage 1)

The information presentation device 20 of the second embodiment will be described in terms of Usage 1.

As shown in FIG. 5, the information presentation device 20 of the second embodiment exhibits a directivity presentation guiding a vehicle to its destination in connection with the car navigation system N.

When the information generator 15 of the car navigation system N transmits information to the controller 24, the controller 24 generates drive signals with vibration intensities selected for the vibrators 22a, 22b. The controller 24 sends drive signals to the vibrators 22a, 22b so as to concurrently drive the vibrators 22a, 22b to vibrate. This causes vibration with any one of the virtual vibrating sources 24a to 24e, interposed between the vibrators 22a, 22b, so that vibration will propagate toward the vibration transmitters B21, B22.

(Usage 2)

Figure 7:
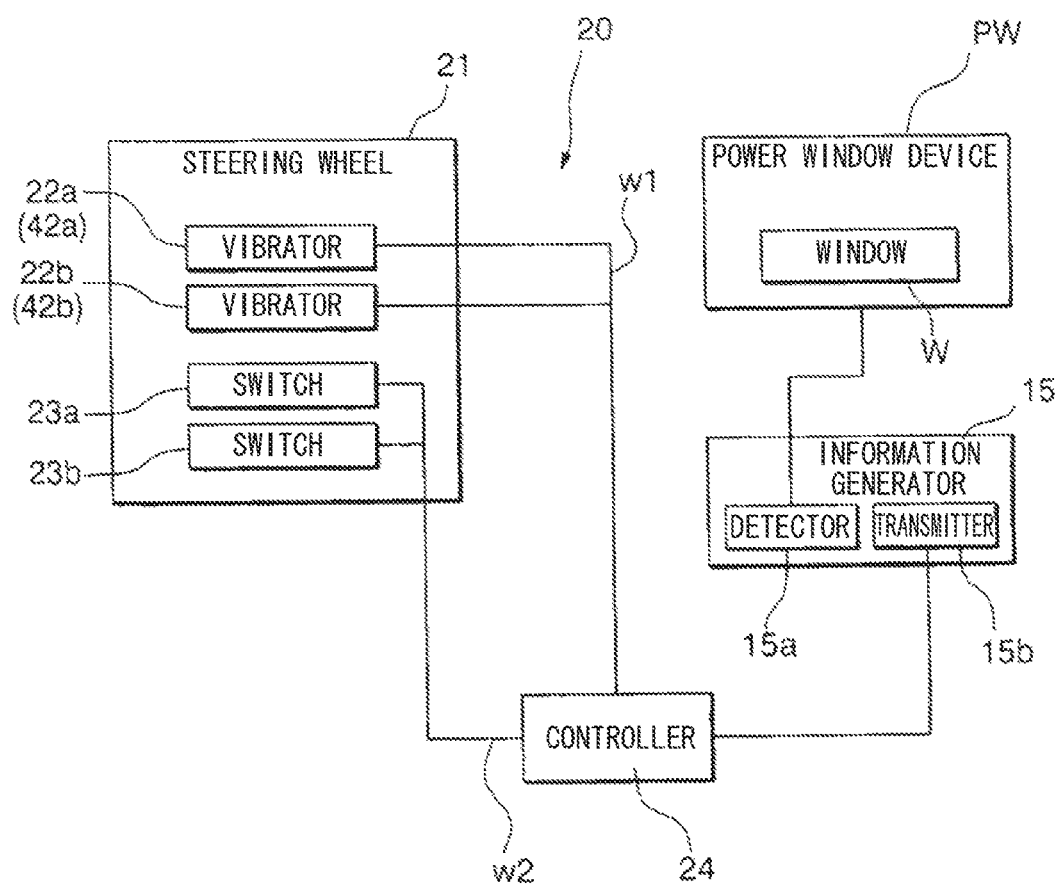
FIG. 7 A block diagram showing the constitution of the information presentation device of the second embodiment in connection with Usage 2.

Next, the information presentation device 20 of the second embodiment will be described in terms of Usage 2 with reference to FIGS. 5 and 7. FIG. 7 is a block diagram showing the constitution of the information presentation device 20 according to Usage 2.

As shown in FIGS. 5 and 7, the information presentation device 20 using the switches 23a, 23b can be used to present an open/close position of the window W at a driver's seat of a vehicle. Similar to the first embodiment, the switch 23a is assigned as a close switch of the window W while the switch 23b is assigned as an open switch of the window W. A driver is able to press the switch 23a or 23b so as to stop the window W at an appropriate position while holding the steering wheel 21 and gazing the front direction in driving a vehicle. At this time, the left and right vibrators 22a, 22b are varied in their vibration intensities depending on the open/close position of the window W.

In the second embodiment, the virtual vibrating sources 24a to 24e match with discrete open/closes positions of the window W, for example, wherein a driver is able to sense the position of the virtual vibrating source 24a indicating the fully closed state of the window W. A driver is able to sense the position of the virtual vibrating source 24e indicating the fully opened state of the window W. A driver is able to sense the position of the virtual vibrating source 24b indicating that the window W is not completely closed but is closed halfway or more. A driver is able to sense the position of the virtual vibrating source 24d indicating that the window W is not completely opened but opened halfway or more.

To present a driver with the half closed state (or the half opened state) of the window W, the controller 24 sends drive signals to drive the vibrators 22a, 22b with the same vibration intensity.

When the vibration intensity of the vibrator 22a is increased to be higher than the vibration intensity of the vibrator 22b, a driver will be able to sense a vibrating source whose position is close to the virtual vibrating source 24a rather than the virtual vibration source 24c, indicating the state of the window W which is closed halfway or more. Alternatively, when the vibration intensity of the vibrator 22b is increased to be higher than the vibration intensity of the vibrator 22a, a driver will be able to sense a vibrating source whose position is close to the virtual vibrating source 24e rather than the virtual vibrating source 24c, indicating the state of the window W which is opened halfway or more.

Thus, the information presentation device 20 of the second embodiment implements a method of presenting tactile information via driver's hands holding the steering wheel 21 in addition to a method of presenting visual information, displaying a map and a running direction on a display, and a method of presenting audio information using audio guidance, thus allowing a driver to adequately sense information without turning his/her eyes away from the front direction of a vehicle.

Additionally, a driver is able to sense the actual presence of a vibrating source at five positions corresponding to the virtual vibrating source 24a to 24e when the vibrators 22a, 22b are adequately varied in their vibration intensities. That is, it is possible to present a driver with the detailed information by using two vibrators, realizing two or more vibrating sources.

(First Variation)

Next, variations of the information presentation device 20 of the second embodiment will be described.

A first variation, in which vibration transmission characteristics of the steering wheel 21 are measured in advance, does not cause a difference of vibration intensity between the vibrators 22a and 22b but implements the controller 24 to supply drive signals to the vibrators 22a, 22b in accordance with a transmission function of vibration propagating through the steering wheel 21, so that a driver will be able to sense the actual presence of a vibrating source at one position among the positions of the virtual vibrating sources 24a to 24e. At this time, it is possible to drive the vibrators 22a, 22b with driver signals whose phases differ from each other.

According to the configuration of the first variation, a driver is able to sense a plurality of vibrating sources which is localized using two vibrators 22a, 22b installed in the information presentation device 20; hence, it is possible to present a driver with information using tactile stimuli.

(Second Variation)

A second variation does not drive the vibrators 22a, 22b in accordance with a transmission function inherently ascribed to the material of the steering wheel 21 but implements the controller 24 to supply drive signals to the vibrators 22a, 22b realizing the actual presence of a vibrating source at one position among the positions of the virtual vibrating sources 24a to 24e depending on a transmission function of an arbitrary virtual object, so that a driver will be able to sense the position of a vibrating source. At this time, it is possible to drive the vibrators 22a, 22b with drive signals whose phases differ from each other.

That is, the second variation is able to transmit tactile stimuli, which may seemingly propagate through a different material than the steering wheel 21 and the vibration transmitters B21, B22, to a driver's hands which are touching the vibration transmitters B21, B22 of the steering wheel 21.

Third Embodiment

Figure 8:
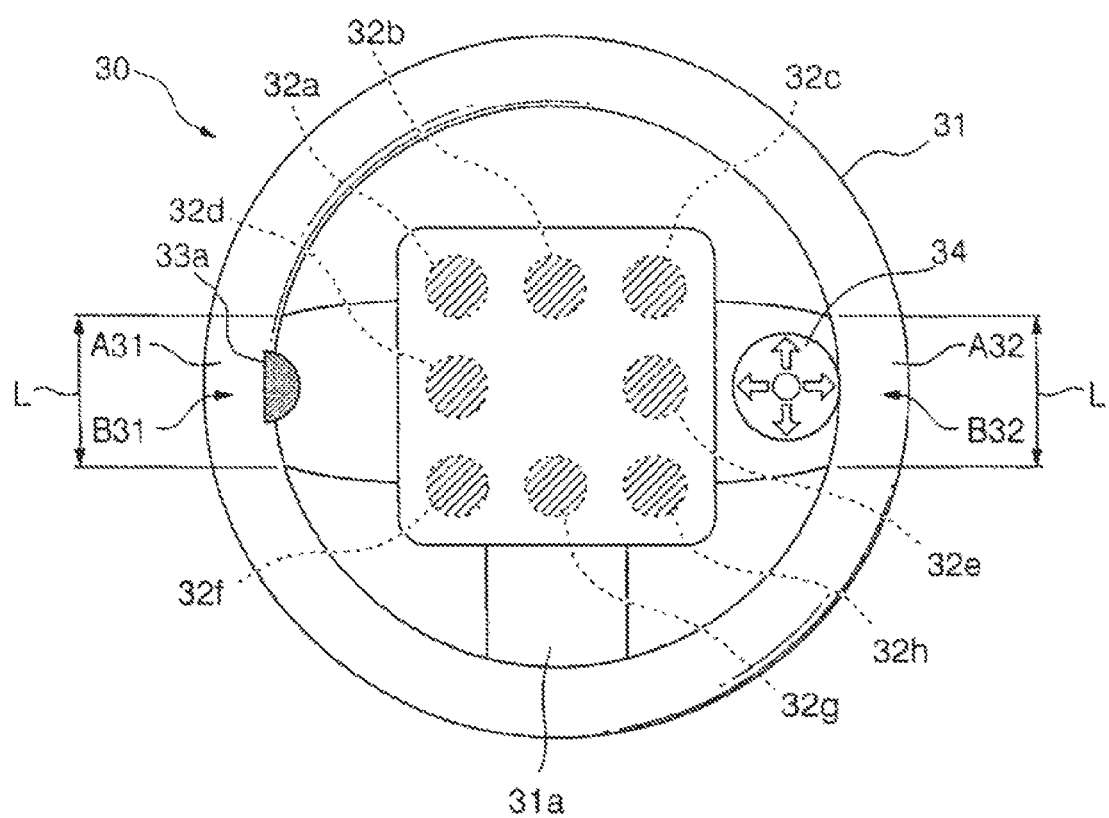
FIG. 8 A schematic illustration of an information presentation device according to a third embodiment of the present invention.
Figure 9:
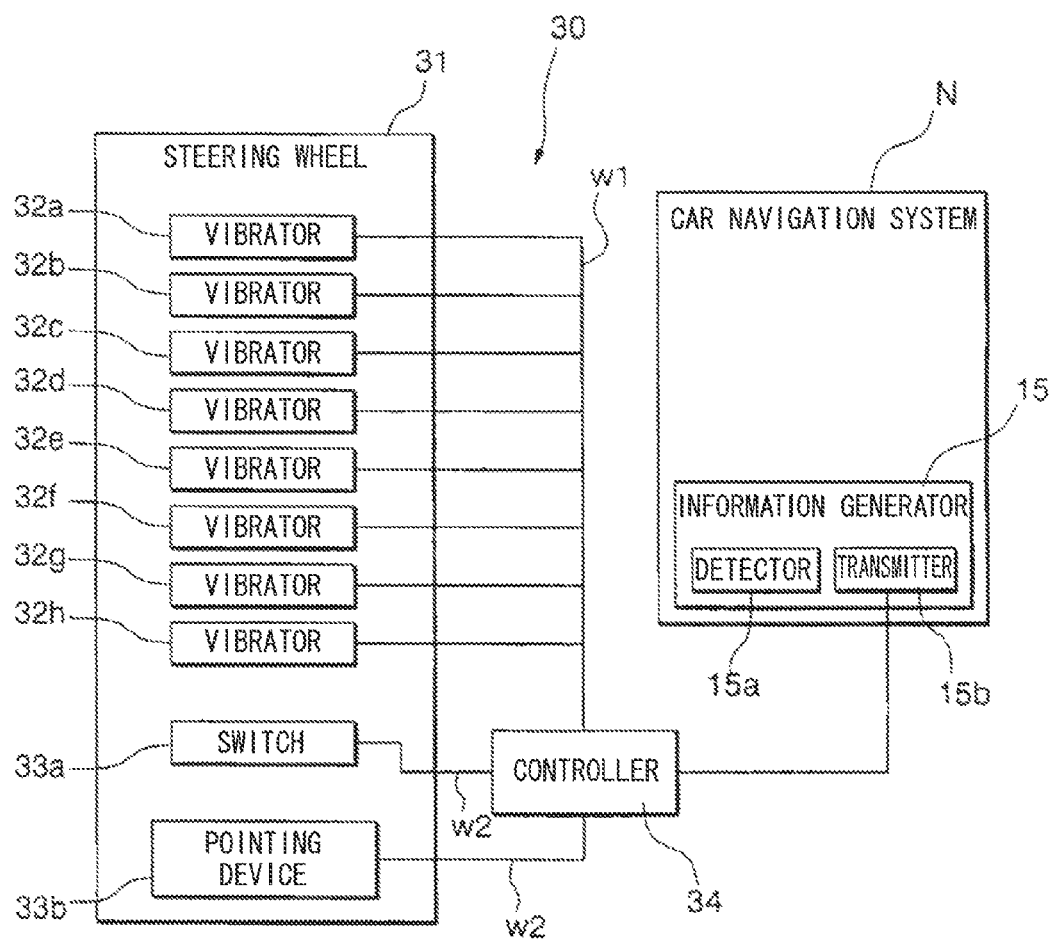
FIG. 9 A block diagram showing the constitution of the information presentation device of the third embodiment in connection with Usage 1 and Usage 2.

Next, an information presentation device 30 according to a third embodiment of the present invention will be described. FIG. 8 is a schematic illustration of the information presentation device 30. FIG. 9 is a block diagram showing the constitution of the information presentation device 30.

The information presentation device 10 of the first embodiment furnishes the steering wheel 11 with the seven vibrators 12a to 12g. In contrast, the information presentation device 30 of the third embodiment, as shown in FIGS. 8 and 9, includes a steering wheel 31, eight vibrators 32 (i.e. vibrators 32a, 32b, 32c, 32d, 32e, 32f, 32g, and 32h), a switch 33a, and a pointing device 33b.

Similar to the steering wheel 11 of the first embodiment, the steering wheel 31 has a ring-shaped external configuration, wherein a steering center 31a is arranged at the center of a ringed portion. In the third embodiment, the steering wheel 31 is furnished with holding parts A31, A32 at the right and left ends thereof in a view of a vehicle's driver situated in front of the steering wheel 31. Similar to the holding parts A1, A2 of the first embodiment, the holding parts A31, A32 of the third embodiment have a length L. Similar to the vibration transmitters B1, B2 of the first embodiment, vibration transmitters B31, B32 are arranged at the positions of the holding parts A31, A32 of the third embodiment.

The vibrators 32a to 32h are embedded in the steering center 31a. The vibrators 32a to 32h are arranged in a rectangular shape encompassing the center of the steering wheel 31. Similar to the vibrators 12a to 12g of the first embodiment, it is possible to employ vibration motors as the vibrators 32a to 32h.

Similar to the switches 13a, 13b of the first embodiment, it is possible to employ a momentary switch as the switch 33a of the third embodiment. The steering wheel 31 is furnished with the switch 33a at the left holding part A31 thereof in view of a driver situated in front of the steering wheel 31. Similar to the first and second embodiments, the switch 33a of the third embodiment is not entirely embedded in the steering wheel 31 but fixed to the steering wheel 31 such that it projects inwardly from the internal circumference of the ringed portion.

The pointing device 33b is a joy stick which is operable in four directions, wherein the pointing device 33b is able to input a desired position when it is turned down from its center position. The pointing device 33b is positioned at the right holding part A32 in a view of a driver situated in front of the steering wheel 31.

Next, the operation and the usage of the information presentation device 30 of the third embodiment will be described.

A controller 34 selects one of the vibrators 32a to 32h, which needs to be driven, based on data supplied thereto from the information generator 15, thus sending a drive signal to the selected vibrator.

When the controller 34 sends a drive signal to the vibrator 32a, which is selected from among the vibrators 32a to 32h, the vibrator 32a is driven to vibrate so that vibration thereof propagates through the steering wheel 31 and reaches the vibration transmitters B31, B32. Thus, vibration is transmitted to driver's hands which are touching the vibration transmitters B31, B32. At this time, the vibration transmitters B31 and B32 differ from each other in terms of vibration intensity because a path from the vibrator 32a to the vibration transmitter B31 differs from a path from the vibrator 32a to the vibration transmitter B32. A driver is able to sense vibration of the vibration transmitter B31 with his/her left hand while sensing vibration of the vibration transmitter B32 with his/her right hand.

(Usage 1)

Next, the usage of the information presentation device 30 of the third embodiment will be described.

First, the information presentation device 30 will be described in terms of Usage 1 with reference to FIGS. 8 and 9. Similar to Usage 1 of the first embodiment, the information presentation device 30 cooperates with the car navigation system N to present a drive with information for guiding a vehicle to its destination.

In Usage 1, the switch 33a is assigned as a trigger for presenting indicating a running direction of a vehicle destined to its destination whose coordinates are set to the car navigation system N. The pointing device 33b is assigned as an input device for inputting a direction of scrolling a map displayed on the screen of the car navigation system N.

The controller 34 sends a drive signal to the vibrators 32a to 32h based on information generated by the information generator 15. Herein, the position of a vehicle is indicated by the center position of a rectangular shape arranging the vibrators 32a to 32h, wherein the vibrator 32b indicates a front direction; the vibrator 32d indicates a leftward direction; the vibrator 32e indicates a rightward direction; and the vibrator 32g indicates a rear direction.

In order to operate the car navigation device N and scroll a map towards a destination on the display, for example, a driver needs to press the switch 33a with his/her left hand so that the information generator 15 will transmit two-dimensional information, representing a direction toward the destination relative to the current position of a vehicle, to the controller 34.

Based on two-dimensional information transmitted by the information generator 15 of the car navigation system N, the controller 34 selects one of the vibrators 32a to 32h and sends a drive signal to a single vibrator which needs to vibrate. In response to the drive signal, a single vibrator, selected from among the vibrators 32a to 32h, is driven to vibrate so that vibration propagates through the steering wheel 31 and reaches the vibration transmitters B31, B32, whereby vibration is transmitted to driver's hands.

Thus, it is possible to present a driver with information indicating a direction toward a destination relative to the current running direction of a vehicle. Based on tactile stimuli transmitted via the vibration transmitters B31, B32, a driver 32 operates the pointing device 33b with his/her right thumb so as to scroll a map toward the destination.

As another method utilizing the information presentation device 30 in connection with the car navigation system N, a driver may operate the pointing device 33b with his/her right hand to scroll a map and then confirm the current direction of a vehicle toward a point on the map displayed on the screen. Specifically, since the center position among the vibrators 32a to 32h matches a point on a map displayed on the screen, the controller 34 sends drive signals to the vibrators 32a to 32h to vibrate based on information of the information generator 15 such that the vibrator 32b indicates a front direction of a vehicle; the vibrator 32d indicates a leftward direction of a vehicle; the vibrator 32e indicates a rightward direction of a vehicle; and the vibrator 32g indicates a rear direction of a vehicle.

After a driver operates the car navigation system N and operates the pointing device 33b with his/her right hand so as to scroll a map, the driver presses the switch 33a with his/her left hand. In this case, the information generator 15 of the car navigation system N generates two-dimensional information, representing a direction toward the position of a vehicle from a point on a map displayed on the screen, and sends it to the controller 34.

Based on two-dimensional information, the controller 34 sends a drive signal to thereby vibrate a single vibrator which is selected from among the vibrators 32a to 32h. Thus, a driver is able to sense the position at which one of the vibrators 32a to 32h vibrates. That is, it is possible to present a driver with information, representing a direction toward the position of a vehicle from a point on a map displayed on the screen, as tactile stimuli via the vibration transmitters B31, B32 of the steering wheel 31.

(Usage 2)

Next, the information presentation device 30 of the third embodiment will be described in terms of Usage 2 with reference to FIGS. 8 and 9.

In Usage 2, the information presentation device 30 is connected to sensors, installed in the car navigation system N, so as to present a driver with external information of a vehicle. A distance sensor having a detection area in an external space outside the exterior surface of a vehicle can be named as one example of sensors installed in the car navigation system N. Additionally, it is possible to name a sensor that detects another vehicle or obstacles (e.g. walls, sidewalks, traffic signs, electrical poles, etc.) which may exist in the surrounding area in the lateral and rear sides of a vehicle, and a sensor that detects a preceding vehicle which may exist in the front side of a vehicle.

Since the center position among the vibrators 32a to 32h indicates the position of a vehicle, the controller 34 sends drive signals to drive the vibrators 32a to 32h based on information of the information generator 15 so that the vibrator 32b indicates the front direction of a vehicle; the vibrator 32d indicates the leftward direction of a vehicle; the vibrator 32e indicates the rightward direction of a vehicle; and the vibrator 32g indicates the rear direction of a vehicle.

In Usage 2, the foregoing sensors may transmit detection signals to the information generator 15 when a distance between a vehicle and its peripheral vehicle or a distance between a vehicle and an obstacle is smaller than a predetermined distance. The detector 15a of the information generator 15 receives a detection signal from the foregoing sensor so as to determine which sensor having its detection area in a specific direction outputs the detection signal. Based on the determination result, the information generator 15 generates two-dimensional information, representing a direction from a vehicle to an obstacle or its peripheral vehicle, and sends it to the controller 34 via the transmitter 15b.

Based on two-dimensional information of the information generator 15, the controller 34 sends a drive signal to vibrate a single vibrator selected from among the vibrators 32a to 32h.

Thus, it is possible to present a driver with information, representing the position of an obstacle or a peripheral vehicle relative to the current position of a vehicle, as tactile stimuli. This Usage 2 demonstrates an effect of assisting an unskilled driver who is not good at stopping and parking a vehicle in a garage or placing it in a tandem parking manner.

In this connection, it is possible to furnish a vehicle with a sensor for detecting a relative traveling direction established between a vehicle and its peripheral vehicle. In this case, it is possible to present a driver with information, representing a relative traveling direction established between a vehicle and its peripheral vehicle other than a direction from a vehicle to an obstacle or a peripheral vehicle, by way of tactile stimuli. Additionally, it is possible to alert a driver that a peripheral vehicle is moving toward a vehicle.

(Usage 3)

Figure 10:
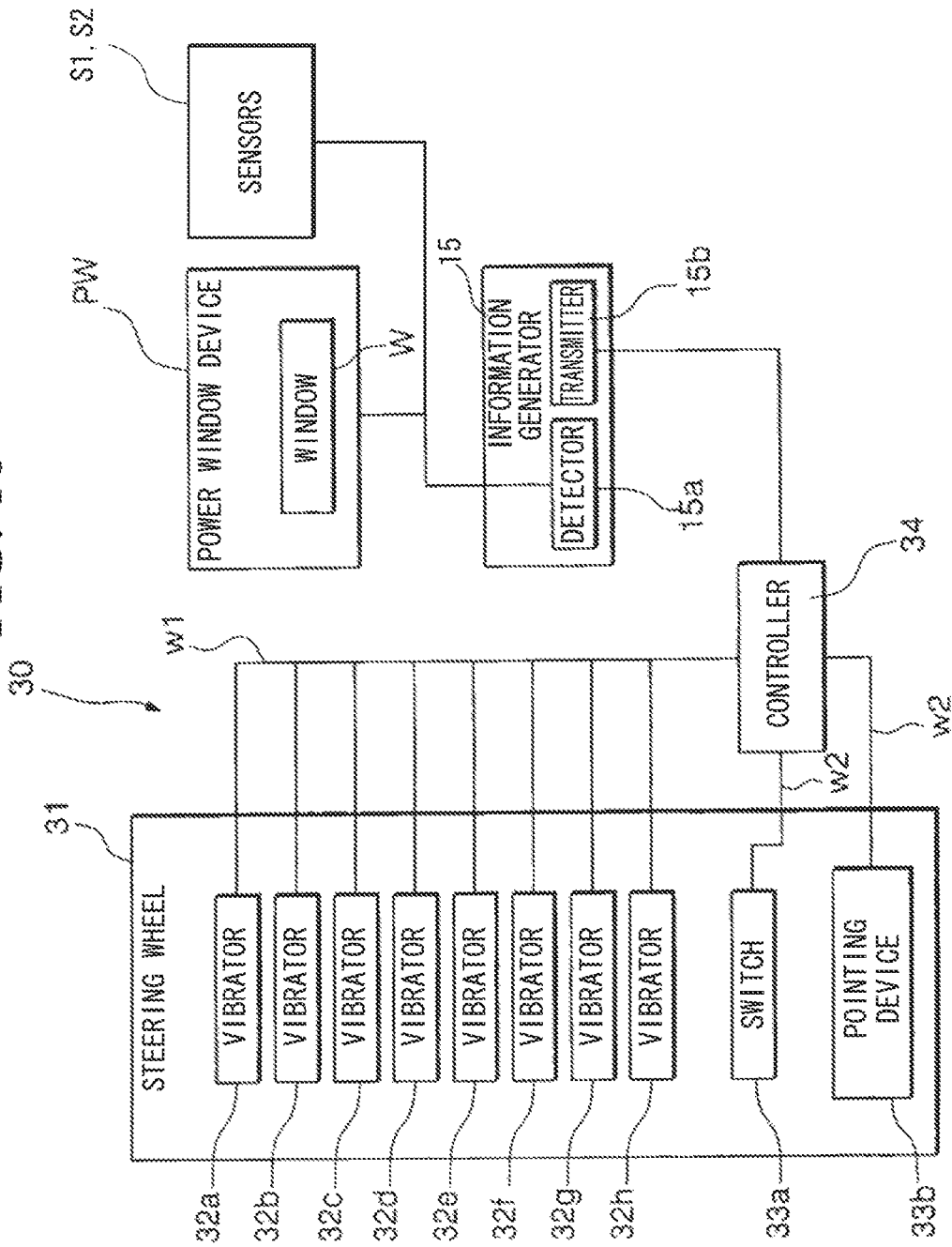
FIG. 10 A block diagram showing the constitution of the information presentation device of the third embodiment in connection with Usage 3 and Usage 4.

Next, the information presentation device 30 will be described in terms of Usage 3 with reference to FIGS. 8 and 10. FIG. 10 is a block diagram showing the constitution of the information presentation device 30.

In Usage 3, the information presentation device 30 presents a driver with external information of a vehicle in connection with sensors S1 installed in a vehicle. For example, a traffic system, which installs an image sensor having sight in the front direction of a running vehicle so as to identify division lines (e.g. traffic division lanes), drawn on the opposite sides of each traffic lane, has been known. In Usage 3 in which the sensor S1 such as an image sensor sends image information to the information generator 15, the information generator 15 sends two-dimensional information, representing a deviating direction, to the controller 34 when a vehicle deviates from a traffic lane. The controller 34 drives the vibrators 32a to 32h based on two-dimensional information transmitted from the information generator 15. Herein, since the center position among the vibrators 32a to 32h indicates the current position of a vehicle, the controller 34 vibrates at least a single vibrator, selected from among the vibrators 32a to 32h, so as to indicate a deviating direction of a vehicle. Thus, the information presentation device 30 is able to alert a driver of a vehicle.

(Usage 4)

Next, the information presentation device 30 will be described in terms of Usage 4 with reference to FIGS. 8 and 10. Herein, the information presentation device 30 present a driver with external information of a vehicle in connection with sensors S2 installed in a vehicle. For example, it presents a driver with weather conditions, such as wind speed, affecting driving by way of another method not using visual and auditory sensations. That is, a wind direction/speed sensor for detecting a wind direction and wind speed in the external environment of a vehicle is installed as the sensor S2, thus sending its detection signal to the information generator 15.

The information generator 15 generates two-dimensional information, representing a wind direction, and sends it to the controller 34 when a detection signal of the wind direction/speed sensor S2 indicates wind speed higher than wind speed which is determined by a driver in advance or when it indicates that wind is blowing at wind speed higher than wind speed which is determined in advance in a design stage of a vehicle as wind speed affecting a steering operation of a vehicle.

Based on two-dimensional information of the information generator 15, the controller 34 drives and vibrates a single vibrator selected from among the vibrators 32a to 32h. Vibration of the selected vibrator is transmitted to driver's hands as tactile stimuli. Thus, the information presentation device 30 is able to present a drive with information representing a wind direction in the external environment of a vehicle.

As described above, the information presentation device 30 of the third embodiment demonstrates the same effect as the information presentation device 10 of the first embodiment.

Additionally, the information presentation device 30 of the third embodiment provides an easy operation for a driver to input a desired direction by use of the pointing device 33b, which is coupled with the controller 34 and attached to the steering wheel 31.

Moreover, it is possible to inform a driver of a direction from a vehicle to an obstacle or a peripheral vehicle on the center portion of the steering wheel 31 by way of tactile stimuli because the vibrators 32a to 32h are arranged in a two-dimensional manner encompassing the center of the ringed portion of the steering wheel 31.

It is possible to further apply design changes to the first to third embodiments.

As the information which the information presentation devices 10, 20, 30 present to a driver of a vehicle, it is possible to employ running condition variations due to a driving operation of a vehicle. For example, it is possible to provide information indicating an operating condition of a vehicle, information informing a driver of a hazard against a vehicle, and information informing a driver of an external condition of a vehicle. Specifically, it is possible to provide information indicating occurrence of a trouble or failure in a vehicle, information indicating the presence of another vehicle approaching a vehicle from its external area, information indicating weather (e.g. a wind direction and wind speed) external to a vehicle, and guidance information indicating a running speed by way of the car navigation system N. In this connection, the information which the information generator 15 sends to the controllers 14, 24, 34 is not necessarily limited to the foregoing information.

The first to third embodiments employ a steering wheel having a ring-shaped external configuration, but the shape of a steering wheel is not limited to this configuration; hence, it is possible to employ a steering wheel having a rectangular shape. Additionally, the information presentation devices 10, 20, 30 according to the first to third embodiments can be applied to a lever instead of a steering wheel. In this case, it is possible to demonstrate the same effect described above.

Additionally, it is possible to reshape a holding part of a steering wheel such that a vibration transmitter projects from the external surface of a steering wheel, thus achieving a close contact state between the vibration transmitter and a driver's hand. That is, it is possible to appropriately shape a vibration transmitter to an extent that the vibration transmitter will not cause a sense of incongruity and inconvenience for a driver who is operating a steering wheel.

The first to third embodiments employ vibration motors as vibrators; but this is not a restriction. As vibrators, for example, it is possible to employ piezoelectric vibrators; alternatively, it is possible to use other materials for vibrators.

The first to third embodiments employ momentary switches as switches; but this is not a restriction. As switches, for example, it is possible to employ micro switches, slide switches, or pressure switches; or alternatively, it is possible to use other materials for switches.

The information presentation device 20 of the second embodiment realizes five virtual vibrating sources 24a to 24e by use of two vibrators 22a, 22b, wherein it is possible to change vibration intensity ratios to drive signals input to the vibrators 22a, 22b in response to a threshold of human's audio perception, thus appropriately increase or decrease the number of virtual vibrating sources.

The information presentation device 30 of the third embodiment includes the pointing device 33b capable of inputting four directions, wherein it is possible to appropriately increase or decrease the number of inputted directions. For example, it is possible to employ a pointing device which is able to input eight directions.

Additionally, the information presentation device 30 of the third embodiment arranges the switch 33a on the left-hand side of a driver while arranging the pointing device 33b on the right-hand side of a driver, wherein it is possible to reverse the positional relationship between them. That is, it is possible to arrange the pointing device 33b on the left-hand side of a driver while arranging the switch 33a on the right-hand side of a driver.

The first to third embodiments are not necessarily limited in terms of the number of vibrators; hence, it is possible to appropriately increase or decrease the number of vibrators.

Additionally, it is possible to appropriately combine the constituent elements described in conjunction with the first to third embodiments and their variations. For example, the third embodiment may be reconfigured in a similar manner as the first embodiment, wherein a plurality of vibrators is selected from among the vibrators 32a to 32h so that the selected vibrators are sequentially driven with a time different applied to their vibration start timings. In this case, it is possible to present directive information indicative of the direction of a vehicle which a driver is able to sense by intuition.

Fourth Embodiment

Next, an information presentation device according to a fourth embodiment of the present invention will be described with reference to FIGS. 4, 5, and 11.

Figure 11:
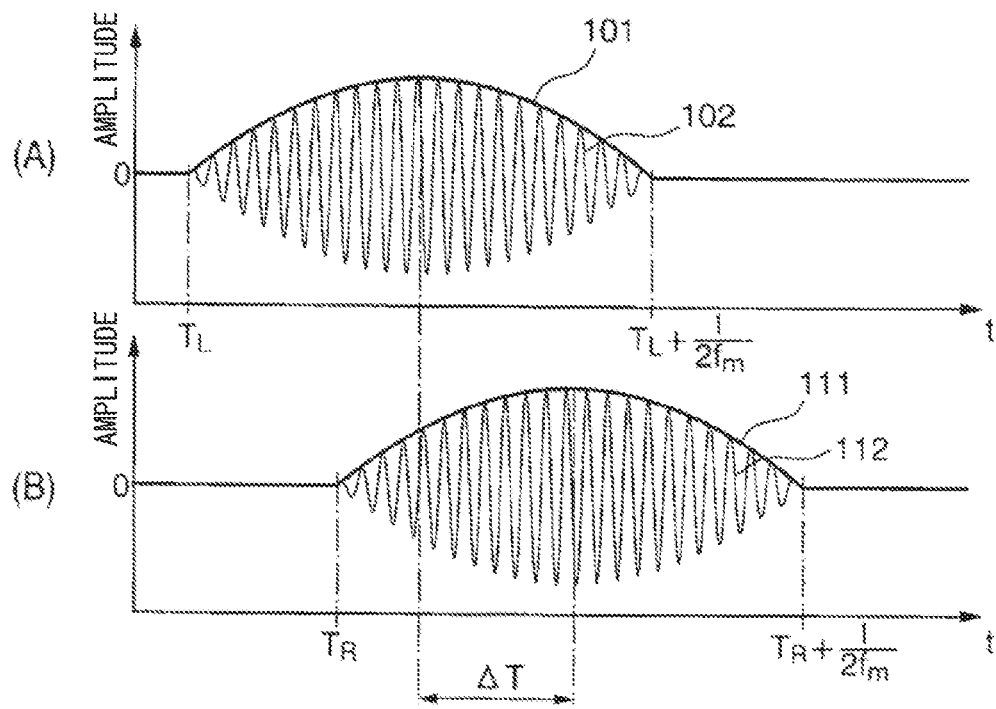
FIG. 11 Graphs showing control waveforms of vibrators installed in an information presentation device according to a fourth embodiment of the present invention.

FIG. 11 includes graphs showing control waveforms generated by an information presentation device 40 of the fourth embodiment, wherein the horizontal axis represents time while the vertical axis represents amplitude. The information presentation device 40 arranges a vibrator 42a on the left-hand side and a vibrator 42b on the right-hand side in view of a driver situated in front of the steering wheel 21. FIG. 11(A) shows a control waveform 102 of the vibrator 42a positioned on the left-hand side of the steering wheel 21, while FIG. 11(B) shows a control waveform 112 of the vibrator 42b positioned on the right-hand side of the steering wheel 21.

The external configuration of the information presentation device 40 of the fourth embodiment is identical to that of the information presentation device 20 of the second embodiment (see FIG. 4). As shown in FIG. 5, the information presentation device 40 includes the vibrators 42a, 42b instead of the vibrators 22a, 22b as well as a controller 44 instead of the controller 24.

The information presentation device 40 includes the vibrators 42, 42b which include piezoelectric vibrators. Using piezoelectric vibrators, the information presentation device 40 is able to control vibration frequencies in addition to vibration intensity with the vibrators 42a, 42b.

In general, it is known that humans are able to perceive vibration frequencies, ranging from 150 Hz to 200 Hz. When eccentric motors are used as the vibrators 42a, 42b, however, the vibration intensity of the vibrators 42a, 42b depends on the rotation speed of eccentric motors with the same amount of eccentricity. For this reason, it may not be possible to set the vibration frequency of the vibrators 42a, 42b to the perceptible vibration frequency even when the vibration intensity is controlled to match a desired intensity. Contrarily, when the vibrators 42a, 42b include piezoelectric vibrators which can be easily controlled in the vibration intensity and the vibration frequency independently, it is possible to easily control the vibration intensity of the vibrators 42a, 42b at a desired value while confining the vibration frequency of the vibrators 42a, 42b within the perceptible vibration frequency.

As shown in FIG. 5, the controller 44 is connected to the vibrators 42a, 42b. The controller 44 of the fourth embodiment differs from the controller 24 of the second embodiment in that it is able to control the vibrators 42a, 42b so as to cause an apparent movement phenomenon sensed by a driver who is holding the steering wheel 21 with the holding parts A21, A22. That is, the controller 44 generates control waveforms causing a vibrating source which moves in left-right directions in view of a driver situated in front of the steering wheel 21.

To present a driver with sensation as if a vibrating source moves from the left to the right in view of a driver situated in front of the steering wheel 21, for example, the controller 44 starts the vibrator 42a to vibrate at time $T_L$ (see FIG. 11(A)) and then starts the vibrator 42b to vibrate at time $T_R$ which is delayed from time $T_L$ by a certain time interval $\Delta T$ (see FIG. 11(B)). That is, the controller 44 generates the control waveform 102 causing the vibrator 42a to vibrate and the control waveform 112 causing the vibrator 42b to vibrate, thus generating vibration with a phase shift corresponding to the time interval $\Delta T$.

The controller 44 generates the control waveform 102 which causes the vibrator 42a to start vibration at time $T_L$, gradually increases its amplitude, and then gradually decreases its amplitude, thus stopping the vibrator 42a to vibrate. Similarly, the controller 44 generates the control waveform 112 which causes the vibrator 42b to start vibration at time $T_R$, gradually increases its amplitude, and then gradually decreases its amplitude, thus stopping the vibrator 42b from vibrating.

After the controller 44 starts the vibrator 42a to vibrate in accordance with the control waveform 102, the vibrator 42a gradually increases its vibration intensity while the control waveform 102 is increased in amplitude. At this time, the controller 44 causes a driver, who senses vibration of the vibrator 42a, to feel as if a vibrating source will be approaching the vibrator 42a. The vibrator 42a gradually decreases its vibration intensity while the control waveform 102 is decreased in amplitude. At this time, the controller 44 causes a driver, who senses vibration of the vibrator 42a, to feel as if a vibrating source is leaving off from the vibrator 42a.

After the controller 44 starts the vibrator 42b to vibrate in accordance with the control waveform 112, the vibrator 42b gradually increases its vibration intensity while the control waveform 112 is increased in amplitude. At this time, the controller 44 causes a driver, who senses vibration of the vibrator 42b, to feel as if a vibrating source is approaching the vibrator 42b. The vibrator 42b gradually decreases in vibration intensity while the control waveform 112 is decreased in amplitude. At this time, the controller causes a driver, who senses vibration of the vibrator 42b, to feel as if a vibrating source is leaving off from the vibrator 42b.

When the vibrators 42a, 42b vibrate in accordance with the control waveforms 102, 112, a driver may feel as if a vibrating source is approaching the vibrator 42a due to a phase difference corresponding to the time interval ΔT between the control waveforms 102, 112, and then the vibrating source is moving toward the vibrator 42b after the time interval ΔT elapses from time $T_L$. The fourth embodiment is able to present a driver with a sensation as if a vibrating source is moving until the control waveforms 102, 112 are terminated in amplitude after they start to increase in amplitude.

Contrarily, to present a driver with a sensation as if a vibrating source is moving from the right to the left in a driver's view, the controller 44 firstly starts the vibrator 42b to vibrate and then starts the vibrator 42a to vibrate with a delay of the time interval ΔT.

The controller 44 generates the control waveforms 102, 112, causing the vibrators 42a, 42b to vibrate, in accordance with Equation 1 and Equation 2.

$$A_L(t) = A\ \sin\{2\pi fm(t - T_L)\} \cdot \sin(2\pi ft) \quad \text{[Equation 1]}$$
$$\left[T_L \le t \le T_L + \frac{1}{2fm}\right]$$
$$A_L(t) = 0$$
$$\left[0 \le t < T_L, T_L + \frac{1}{2fm} < t\right]$$

$$A_R(t) = A\ \sin\{2\pi fm(t - T_R)\} \cdot \sin(2\pi ft) \quad \text{[Equation 2]}$$
$$\left[T_R \le t \le T_R + \frac{1}{2fm}\right]$$
$$A_R(t) = 0$$
$$\left[0 \le t < T_R, T_R + \frac{1}{2fm} < t\right]$$

Equation 1 represents the control waveform 102 of the vibrator 42a (see FIG. 11(A)) positioned on the left-hand side in a driver's view, while Equation 2 represents the control waveform 112 of the vibrator 42b (see FIG. 11(B)) positioned on the right-hand side in a driver's view. The control waveforms 102, 112 are expressed as functions $A_L(t), A_R(t)$ which vary with respect to time.

The control waveform 102 expressed in Equation 1 is a waveform modulating the amplitude of a carrier wave, i.e. a sine wave with frequency f and amplitude A, with a modulation wave 101 expressed as $\sin(2\pi fm(T-T_L))$. The control waveform 112 expressed in Equation 2 is a waveform modulating the amplitude of a carrier wave, i.e. a sine wave with frequency f and amplitude A, with a modulation wave 111 expressed as $\sin(2\pi fm(T-T_R))$. Equations 1, 2 include fm representing the number of times in repeating the modulation waves 101, 111 in a unit time, i.e. the number of repetition times per one second in the fourth embodiment. In this connection, the fourth embodiment sets frequency f of 150 Hz to the control waveforms 102 and 112.

The controller 44 generates the modulation waves 101, 111 have chevron waveforms which are started at time TL, TR, wherein a time until a vibrating source stops moving after it starts moving is represented using a time until the modulation waves 101, 111 are terminated in amplitude after they start to increase in amplitude.

The modulation waves 101 and 111 are each regarded as a half-period waveform corresponding to a sine wave with a low frequency, e.g. 0.5 Hz. This allows a driver to sense one second as a period of time until a vibrating source stops moving after it starts moving. Since a sine wave has a low frequency of 0.5 Hz which is lower than human's perceptible vibration frequency, it is difficult for a driver to sense vibration by use of tactile stimuli solely depending on the modulation waves 101, 111 each configured of a half-period waveform corresponding to a sine wave of 0.5 Hz. For this reason, amplitude modulation is performed according to Equations 1, 2 such that the modulation waves 101, 111 are each multiplied by a sine wave with the frequency f. In this connection, the fourth embodiment involves the setting where $T_L < T_R$, ΔT=0.2 seconds.

The vibrators 42a, 42b are driven to vibrate in response to the control waveforms 102, 112, which are varied in amplitude with respect to time t according to Equations 1, 2, input thereto from the controller 44.

As described above, the controller 44 modulates the amplitudes of the modulation waves 101, 111, which allow a driver to sense an apparent movement phenomenon, by use of a carrier wave with a perceptible vibration frequency, thus producing the control waveforms 102, 112, whereby it supplies the control waveforms 102, 112 to the vibrators 42a, 42b, thus driving the vibrators 42a, 42b to vibrate. In the information presentation device 40 of the fourth embodiment, the controller 44 individually drives the vibrators 42a, 42b to vibrate so as to transmit vibration of modulation waves to a driver, thus presenting a driver with a sensation as if a vibrating source is moving in left-right directions on the steering wheel 21.

The fourth embodiment adopts the setting in which the modulation waves 101, 111 have frequency fm of 0.5 Hz; the control waveforms 102, 112 have frequency f of 150 Hz; and a time interval between the vibrator 42a starting its vibration and the vibrator 42b starting its vibration is set to 0.2 seconds; but they are not necessarily limited to these values. That is, it is possible to appropriately change the frequency and the time interval regarding a control waveform driving a vibrator in such a way that a driver may easily sense vibration as tactile stimuli.

Additionally, the fourth embodiment defines the control waveforms 102, 112 according to Equations 1, 2; but the control waveforms 102, 112 are not necessarily limited to Equations 1, 2. For example, the value of amplitude A in Equations 1, 2 is not necessarily set to the same value with respect to both the control waveforms 102, 112.

In the fourth embodiment, the controller 44 may repeat the control waveforms 102, 112, with the foregoing phase difference, multiple times. That is, it is possible to repeat the control waveform 102 with one period corresponding to a period of time ranging from time $T_L$ to time $T_L+½fm$, while it is possible to repeat the control waveform 112 with one period corresponding to a period of time ranging from time $T_R$ to time $T_R+½fm$. Alternatively, it is possible to repeat each of the control waveforms 102, 112 with one period corresponding to a period of time ranging from time $T_L$ to time $T_R+½fm$. Except for these settings, it is possible to repeat the control waveform 102, 112, with a certain time interval or an arbitrary time interval therebetween, multiple times.

Although the fourth embodiment employs piezoelectric vibrators as the vibrators 42a, 42b, it is possible to employ voice coil motors (VCM) as vibrators which can be controlled in frequency and vibration intensity independently. As devices used for the vibrators 42a, 42b other than piezoelectric vibrators and VCM, it is possible to appropriately employ any other devices which can be controlled in frequency and vibration intensity independently.

Fifth Embodiment

Next, an information presentation device 50 according to a fifth embodiment of the present invention will be described with reference to FIGS. 4, 5, and 12.

The information presentation device 50 of the fifth embodiment is designed such that a controller 54 controls the vibrators 42a, 42b attached to the steering wheel 21. FIG. 12 includes graphs showing control waveforms which the controller 54 of the information presentation device 50 generates to drive the vibrators 42a, 42b to vibrate, wherein the horizontal axis represents time while the vertical axis represents amplitude. That is, FIG. 12(A) shows a control waveform for driving the vibrator 42a, while FIG. 12(B) shows a control waveform for driving the vibrator 42b.

The external configuration of the information presentation device 50 of the fifth embodiment is identical to that of the information presentation device 20 of the second embodiment, whereas it includes the vibrators 42a, 42b instead of the vibrators 22a, 22b and the controller 54 instead of the controller 24. The controller 54 of the fifth embodiment differs from the controller 24 of the second embodiment and the controller 44 of the fourth embodiment in that it presents a driver with a sensation as if a vibrating source is moving in a discrete manner.

The phrase "a sensation as if a vibrating source is moving in a discrete manner" conveys the meaning of presenting a driver with tactile stimuli as if the virtual vibrating sources 24a, 24b, 24c, 24d, and 24e, which are mutually separated from each other as shown in FIG. 6, may actually exist by means of the vibrators 42a, 42b. For example, it is possible to present a driver with a sensation as if a vibrating source is sequentially moving toward positions with spacing of a predetermined distance by way of a sequence in which after a driver senses the virtual vibrating source 24a as an actual vibrating source, the virtual vibrating source 24a stops vibrating, thereafter, a driver senses the virtual vibrating source 24b as an actual vibrating source.

The controller 54 generates control waveforms to sequentially drive the virtual vibrating sources 24a, 24b, 24c, 24d, and 24e within the distance between the vibrators 42a, 42b, thus presenting a driver with a sensation in which a vibrating source is moving in a discrete manner in their order.

Compared with the controller 24 of the second embodiment which changes a ratio of vibration intensity between the vibrators 22a, 22b, the controller 54 of the fourth embodiment produces and changes a time difference between the timings at which the vibrators 42a, 42b start to vibrate.

The operation for presenting a driver with a sensation as if a vibrating source is moving in a discrete manner from the virtual vibrating source 24a to the virtual vibrating source 24e will be described. First, the controller 54 sends a rectangular wave with amplitude $A_{1L}$ (see FIG. 12(A)) to the vibrator 42a in order to render a driver feeling a sensation as if a vibrating source is localized at the virtual vibrating source 24a. Additionally, it sends a rectangular wave with amplitude $A_{1R}$ (see FIG. 12(B)), which is smaller than amplitude $A_{1L}$, to the vibrator 42b at a timing delayed from the rectangular wave of amplitude $A_{1L}$ by a time interval $\Delta T_1$.

Next, the controller 54 sends a rectangular wave with amplitude $A_{2L}$ (see FIG. 12(A)), which is smaller than amplitude $A_{1L}$, to the vibrator 42a in order to render a driver feeling a sensation that a vibrating source has been changed in position from the virtual vibrating source 42a to the virtual vibrating source 24b. Additionally, it sends a rectangular wave with amplitude $A_{2R}$, which is smaller than amplitude $A_{2L}$ but larger than amplitude $A_{1R}$, to the vibrator 42b at a timing delayed from the rectangular wave of amplitude $A_{2L}$ by a time interval $\Delta T_2$. In this connection, the time interval $\Delta T_2$ is shorter than the time interval $\Delta T_1$. Compared to the situation in which the vibrators 42a, 42b are driven to vibrate such that a vibrating source is localized at the virtual vibrating source 24a, it is possible to decrease the vibration intensity of the vibrator 42a but to increase the vibration intensity of the vibrator 42b while reducing a time interval between the timing of a driver sensing vibration of the vibrator 42a and the timing of a driver sensing vibration of the vibrator 42b, thus causing a driver to feel a sensation as if a vibrating source is moving from the virtual vibrating source 24a to the virtual vibrating source 24b.

Thus, the controller 54 decreases the amplitude of the vibrator 42a in a stepwise manner while delaying the vibration start timing of the vibrator 42a in a stepwise manner as a vibrating source is moving in a direction of aligning the virtual vibrating sources 24a, 24b, 24c, 24d, and 24e (i.e. a direction from the vibrator 42a to the vibrator 42b). Additionally, the controller 54 increases the vibrating amplitude of the vibrator 42b in a stepwise manner while advancing the vibration start timing of the vibrator 42b in a stepwise manner.

Figure 12:
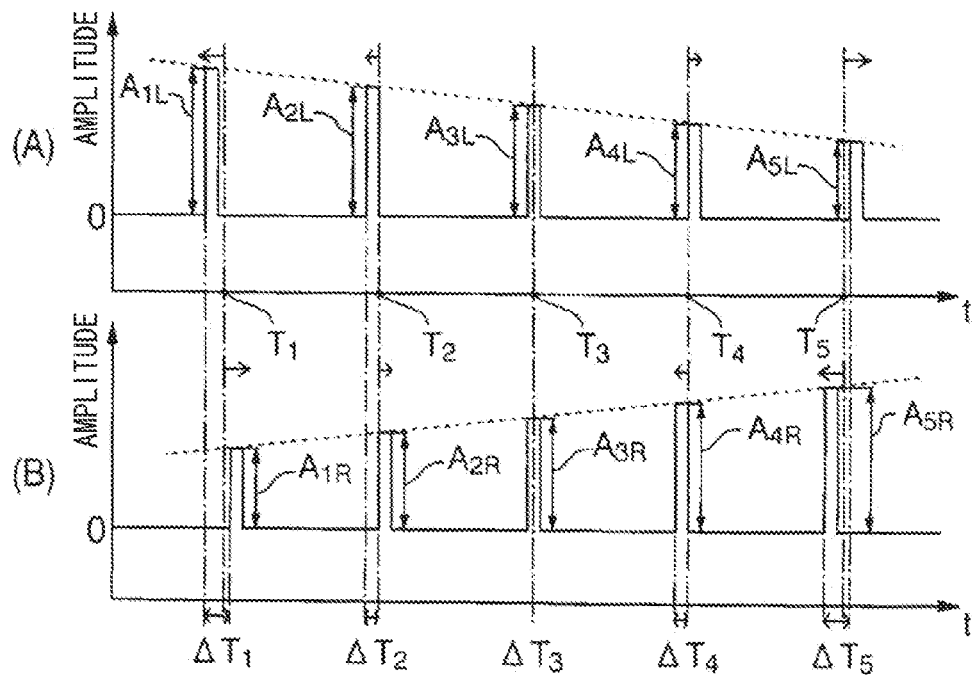
FIG. 12 Graphs showing control waveforms of vibrators installed in an information presentation device according to a fifth embodiment of the present invention.

As shown in FIG. 12, the controller 54 of the fifth embodiment subdivides a time period into times $T_1$ to $T_5$ with a time interval of 0.25 seconds therebetween in correspondence with the virtual vibrating sources 24a to 24e. As shown in FIG. 12(A), the controller 54 produces rectangular waves to advance or delay the vibration start timing of the vibrator 42a relative to each time. As shown in FIG. 12(B), it sets time intervals $\Delta T_1$ to $\Delta T_5$ between the vibration start timing of the vibrator 42a and the vibration start timing of the vibrator 42 as follows.

Virtual vibrating source 24a ($T_1$): $\Delta T_1$=0.02 seconds
Virtual vibrating source 24b ($T_2$): $\Delta T_2$=0.01 seconds
Virtual vibrating source 24c ($T_3$): $\Delta T_3$=0 seconds
Virtual vibrating source 24d ($T_4$): $\Delta T_4$=−0.01 seconds
Virtual vibrating source 24e ($T_5$): $\Delta T_5$=−0.02 seconds As described above, the controller 54 of the fifth embodiment controls the vibrators 42a, 42b to vibrate multiple times with a time difference between the vibration start timing of the vibrator 42a and the vibration start timing of the vibrator 42b. Additionally, the controller 54 gradually decreases the time difference between the vibration start timing of the vibrator 42a and the vibration start timing of the vibrator 42b.

Moreover, the time difference of zero seconds is set between the vibration start timings of the vibrators 42a and 42b at the virtual vibrating source 24c corresponding to the center position between the vibrators 42a and 42b. The controller 54 increases a time difference between vibration start timings as a vibrating source approaches the vibrator 42a or the vibrator 42b.

The fifth embodiment is able to render a driver feeling a sensation that a vibrating source is moving in a discrete manner because the controller 54 controls the vibration start timings of the vibrators 42a, 42b in addition to the vibration intensity of the vibrators 42a, 42b. That is, it is possible to render a driver feeling a sensation as if a vibrating source is actually vibrating while being localized at each of the virtual vibrating sources 24a to 24e with a good accuracy.

In FIG. 12, the controller 54 drives the vibrators 42a, 42b to consecutively vibrate five times; however, it is possible to drive the vibrators 42a, 42b to vibrate five times with different time intervals. The number of times regarding the occurrence of vibration with the vibrators 42a, 42b is not necessarily limited to five times, wherein two or more times may suffice the need to render a driver feeling a sensation as if a vibrating source is moving; hence, it is unnecessary to limit the number of times causing vibration. Additionally, it is possible to solely change the vibration start timing without changing the vibration intensity of the vibrators 42a, 42b. Thus, it is possible to render a driver feeling a sensation as if a vibrating source is moving in left-right directions. Moreover, it is unnecessary to the vibration start timing and the amplitude of rectangular waves to the foregoing values when generating control waveforms driving the vibrators 42a, 42b.

Sixth Embodiment

Figure 13:
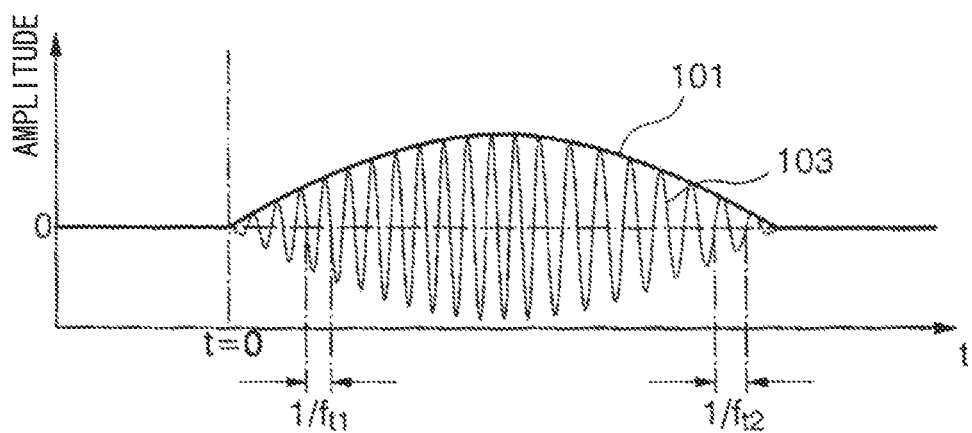
FIG. 13 A graph showing a control waveform of a vibrator installed in an information presentation device according to a sixth embodiment of the present invention.

Next, an information presentation device according to a sixth embodiment of the present invention will be described with reference to FIGS. 4, 5, and 13. The information presentation device 60 of the sixth embodiment is designed such that a controller 64 controls the vibrators 42a, 42b attached to the steering wheel 21. FIG. 13 includes graphs showing control waveforms which the controller 64 produces in order to drive the vibrators 42a, 42b, wherein the horizontal axis represents time while the vertical axis represents amplitude.

The controller 64 of the sixth embodiment controls the vibrators 42a, 42b to render a driver feeling a sensation as if a vibrating source is moving in upward-downward directions, perpendicular to a line segment drawn between the two vibrators 42a and 42b, in a view of a driver situated in front of the steering wheel 21. As shown in FIG. 13, the controller 64 produces a control waveform 103, multiplying a modulation wave 101 by a carrier wave corresponding to a sine wave with human's perceptive vibration frequency. The control waveform 103 of the sixth embodiment differs from the control waveform 102 of the fourth embodiment in that it may change its frequency.

The controller 64 produces the control waveform having a waveform whose frequency is monotonously decreasing. As shown in FIG. 13, the controller 64 performs frequency sweep in such a way that a relatively high frequency $f_{t1}$ is set to a vibration starting stage while a relatively low frequency $f_{t2}$ is set to a vibration terminating stage. The controller 64 produces the control waveform 103 expressed in Equation 3.

$$A(t) = A\,\sin(2\pi f_m t)\cdot \sin(2\pi f(t)t)$$

$$f(t) = -at + b \qquad \text{[Equation 3]}$$

In Equation 3, f(t) denotes a function defining the frequency of a sine wave which is multiplied by the modulation wave 101. According to Equation 3 when a=450 Hz, b=500 Hz, the controller 64 produces the control waveform 103 whose frequency is swept from 500 Hz to 50 Hz by way of a function A(t). In this connection, it is not necessary to perform frequency sweep in an order from a high frequency to a low frequency, but it is possible to perform frequency sweep in an order from a low frequency to a high frequency.

The sixth embodiment is able to render a driver feeling a sensation, via tactile stimuli, as if a vibrating source is moving from a high position to a low position or as if a vibrating source is moving from a low position to a high position because the controller 64 vibrates the vibrators 42a, 42b in response to the control waveform 103 subjected to frequency sweep in a lapse of time.

Although the sixth embodiment employs a single control waveform shown in FIG. 13 in order to render a driver feeling a sensation as if a vibrating source is moving in upward-downward directions, it is possible to combine the control waveform with the foregoing control waveform, as described in the fourth embodiment, which causes a driver to feel a sensation as if a vibrating source is moving in left-right directions. That is, it is possible to multiplex the control waveform shown in FIG. 13 with the control waveform of the fourth embodiment involving a certain time interval, thus causing a driver to feel a sensation as if a vibrating source is moving in slanted directions combining upward-downward directions with left-right directions.

Additionally, the information presentation device 60 of the sixth embodiment can be modified to render a driver feeling a sensation as if a vibrating source is moving two-dimensionally on a two-dimensional plane combining upward-downward directions with left-right directions. For example, it is possible to render a driver feeling a sensation as if a vibrating source is moving along a virtual circumference on a two-dimensional plane or a sensation as if a vibrating source is looping back in its moving direction while turning its running direction on a two-dimensional plane.

Alternatively, it is possible to independently drive the two vibrators 42a, 42b. By independently driving the vibrators 42a, 42b, it is possible to realize a vibrating source which is able to move in upward-downward directions on the right side or in upward-downward directions on the left side, thus presenting a driver with information differently on the right side and on the left side.

In the sixth embodiment, the modulation wave 101 has a period of one second while the control waveform 103 is subjected to frequency sweep from 500 Hz to 50 Hz; but they are not necessarily limited to these values. Additionally, the controller 64 does not necessarily employ Equation 3 as an equation for calculating the control waveform 103.

Seventh Embodiment

Figure 14:
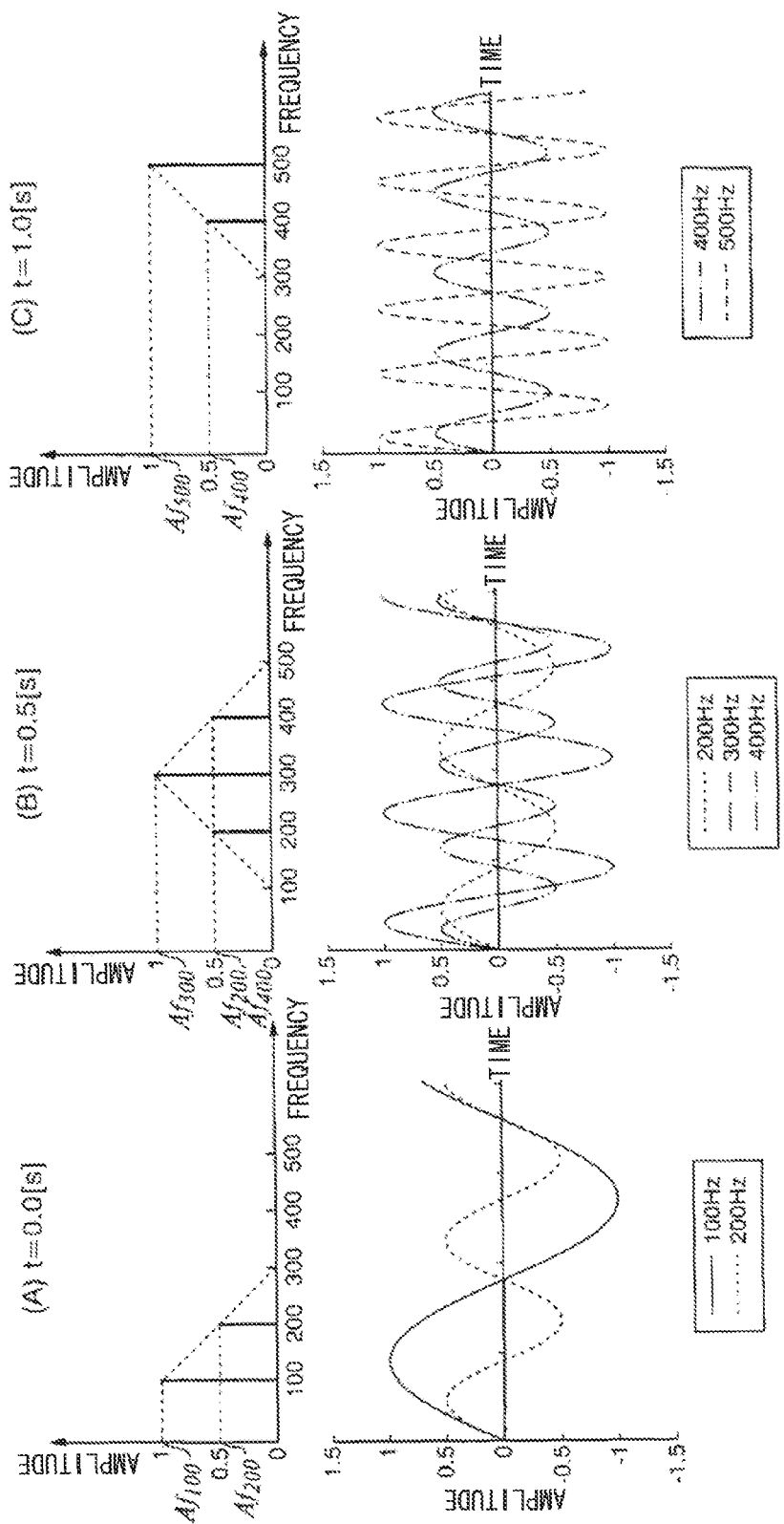
FIG. 14 Graphs showing control waveforms of vibrators installed in an information presentation device according to a seventh embodiment of the present invention.

Next, an information presentation device 70 according to a seventh embodiment of the present invention will be described with reference to FIGS. 4, 5, and 14. The information presentation device 70 of the seventh embodiment is designed such that a controller 74 controls the vibrators 42a, 42b attached to the steering wheel 21. FIGS. 14(A), (B), and (C) show control waveforms generated by the controller 75. Herein, the upper graphs in FIGS. 14(A), (B), (C) show frequency components included in control waveforms, wherein the horizontal axis represents frequency while the vertical axis represents amplitude. The lower graphs in FIGS. 14(A), (B), (C) show superposition of waveforms having different frequencies, wherein the horizontal axis represents time while the vertical axis represents amplitude.

In this connection, the controller 74 of the seventh embodiment operates differently in comparison with the controller 64 of the sixth embodiment, wherein the seventh embodiment operates similar to the sixth embodiment to render a driver feeling a sensation as if a vibrating source is moving in upward-downward directions.

The controller 64 of the sixth embodiment produces the control waveform 103 subjected to frequency sweep over time, thus causing a driver to feel a sensation as if a vibrating source is moving in upward-downward directions. Contrarily, the controller 74 of the seventh embodiment superimposes sine waves having different frequencies so as to produce a control waveform. The controller 74 produces a control waveform as defined in Equation 4. In this connection, Equation 4 superimposes sine waves with frequency fi (where i=1 to 5).

$$A(t) = A\,\sin(2\pi f_m t)\cdot \sum_{1}^{5}\{A_{fi}(t)\cdot \sin(2\pi f_i t)\} \qquad \text{[Equation 4]}$$

The controller 74 combines sine waves with five frequencies f1 to f5, ranging from a low frequency to a high frequency, according to Equation 4, and then performs amplitude modulation using the modulation wave 101, thus producing a control waveform.

As shown in FIG. 14(A), the controller 74 produces a control waveform including plenty of low frequency components, among sine waves of frequencies $f_1$ to $f_5$, at a vibration start time t=0.0 second. Additionally, it produces a control waveform including plenty of high frequency components, among sine waves of frequencies $f_1$ to $f_5$, at time t=tx (e.g. tx=0.1 seconds).

In the seventh embodiment, the controller 74 adopts five frequencies, i.e. $f_1$=100 Hz, $f_2$=200 Hz, $f_3$=300 Hz, $f_4$=400 Hz, and $f_5$=500 Hz, as frequencies of sine waves forming control waveforms generated therein. At the vibration start time t=0.0 seconds shown in FIG. 14(A), a control waveform is formed by way of superimposition of sine waves having relatively low frequencies, i.e. $f_1$=100 Hz and $f_2$=200 Hz, wherein an amplitude $Af_{100}$ of a sine wave $f_1$ is larger than an amplitude $Af_{200}$ of a sine wave $f_2$.

The controller 74 changes a ratio of mixing frequency components over time. Additionally, it gradually decreases the mixing ratio of low frequency components over time as shown in FIGS. 14(B), (C) after it starts presenting a driver with information via vibration. At time t=0.5 seconds shown in FIG. 14(B), an amplitude $Af_{300}$ of a sine wave $f_3$ is the highest amplitude while frequency components lower than or higher than the frequency $f_3$ are reduced in amplitude. At time t=1.0 second shown in FIG. 14(C), a control waveform is formed using sine waves $f_4$ and $f_5$ having relatively high frequencies, wherein an amplitude $Af_{500}$ of the sine wave $f_5$ is larger than an amplitude $Af_{400}$ of the sine wave $f_4$.

Thus, the controller 74 changes its mixing ratio of frequency components over time so as to drive the vibrators 42a, 42b with control waveforms which are shifted from low frequency components to high frequency components. Thus, it is possible to render a driver feeling a sensation as if a vibrating source is moving from a downward direction to an upward direction in view of a driver situated in front of the steering wheel 21.

Contrary to the above, the controller 74 changes its mixing ratio of frequency components over time so as to drive the vibrators 42a, 42b with control waveforms which are shifted from high frequency components to low frequency components. In this case, it is possible to render a driver feeling a sensation as if a vibrating source is moving from an upward direction to a downward direction in view of a driver situated in front of the steering wheel 21.

Additionally, it is possible to combine a control waveform of the seventh embodiment, causing a driver to feel a sensation as if a vibrating source is moving in upward-downward directions, and a control waveform of the fourth embodiment, causing a driver to feel a sensation as if a vibrating source is moving in left-right directions. Thus, it is possible to render a driver feeling a sensation as if a vibrating source is moving in a slanted direction, a circumferential direction, and a loop-back direction on a two-dimensional plane in view of a driver situated in front of the steering wheel 21.

The seventh embodiment forms control waveforms each combining the modulation wave 101 with sine waves having five frequencies, i.e. $f_1$=100 Hz, $f_2$=200 Hz, $f_3$=300 Hz, $f_4$=400 Hz, and $f_5$=500 Hz, with a predetermined mixing ratio; but sine waves forming control waveforms are not necessarily limited to five types of frequencies. Additionally, the mixing ratio of sine waves having different frequencies is not necessarily limited to the foregoing value.

Moreover, an equation defining a control waveform generated by the controller 74 is not necessarily limited to Equation 4, wherein frequency components forming control waveforms are not necessarily limited to five types of frequencies. It is possible to analogously determine a mixing ratio of sine waves forming control waveforms, thus generating control waveform having a plurality of vibration frequencies by way of inverse frequency conversion. For example, it is possible to set a sequentially varying frequency spectrum, which is subjected to inverse Fourier transform to generate a control waveform.

Eighth Embodiment

Figure 15:
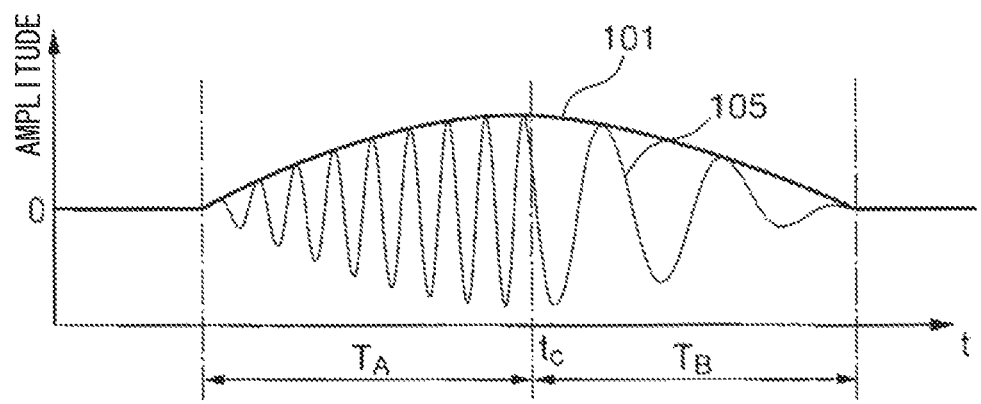
FIG. 15 A graph showing a control waveform of a vibrator installed in an information presentation device according to an eighth embodiment of the present invention.

Next, an information presentation device 80 according to an eight embodiment of the present invention will be described with reference to FIGS. 4, 5, and 15. The information presentation device 80 of the eighth embodiment is designed such that a controller 84 controls the vibrators 42a, 42b attached to the steering wheel 21. FIG. 15 shows a control waveform 105 generated by the controller 84, wherein the horizontal axis represents time while the vertical axis represents amplitude.

In the eighth embodiment, the controller 84 drives the vibrators 42a, 42b in accordance with the control waveform 105 so as to render a driver feeling a sensation as if a vibrating source is moving in near-far directions in the front direction in view of a driver situated in front of the steering wheel 21.

To render a driver feeling a sensation as if a vibrating source is moving in near-far directions, the controller 84 produces the control waveform 105 simulating Doppler effect, thus driving the vibrators 42a, 42b to vibrate in accordance with the control waveform 105.

That is, the controller 84 produces the control waveform 105 representing an amplitude-modulated wave multiplying the modulation wave 101 by a sine wave of a human's perceptible vibration frequency. Additionally, a vibrating source is assumed to be localized at an intermediate point, which is determined in near-far directions in the front direction of a driver, at a boundary time tc, wherein the control waveform 105 is changed in frequency in a former part $T_A$ and a latter part $T_B$ before and after the boundary time tc.

Specifically, in order to realize an observation that a vibrating source is approaching a driver with the former part of the control waveform 105, the controller 84 produces the control waveform 105 multiplying the modulation wave 101 by a carrier wave in which the frequency of the former part $T_A$ becomes higher than the frequency of the latter part $T_B$ with respect to the boundary time tc or a carrier wave in which the frequency of the latter part $T_B$ becomes lower than the frequency of the former part $T_A$.

Equation 5 represents the control waveform 105 involving a carrier wave whose frequency is changed over at time tc. Herein, fa≠fb.

$$A(t) = A \ \sin(2\pi f_m t) \cdot \sin(2\pi f_n t) \qquad \text{[Equation 5]}$$

$$f_n = \begin{cases} f_a (t \leq tc) \\ f_b (t > tc) \end{cases}$$

According to Equation 5, the controller 84 produces the control waveform 105 whose frequency is changed from the frequency fa to the frequency fb at the boundary time t=tc. That is, the controller 84 produces the control waveform 105, simulating the Doppler effect, causing a driver to feel a sensation as if a vibrating source is reversing its traveling direction relative to a driver before and after time t=tc.

When the lower column of Equation 5 adopts fa=300 Hz and fb=50 Hz, for example, it is possible to cause a drive to feel a sensation as if a vibrating source temporarily approaches to a driver and then departs from a driver. Alternatively, when fa=50 Hz and fb=300 Hz, it is possible to realize the reverse of the traveling direction in which a vibrating source travels relative to a driver.

When the frequency is changed at time t=tc while the vibration of the vibrators 42a, 42b is transmitted as tactile stimuli, it is possible to render a driver feeling a sensation as if a vibrating source moves toward a driver from his/her far side and then departs from the driver or a sensation as if a vibrating source temporarily departs from a driver and then approaches the driver.

Thus, as described in Usage 2 of the third embodiment, it is possible to present a driver with relative movement information between a vehicle and a peripheral vehicle because the information presentation device 80 of the eighth embodiment is able to render a driver feeling a sensation as if a vibrating source is traveling in far-near directions.

With the control waveform 105 generated by the controller 84 of the eighth embodiment, it is possible to render a driver feeling a sensation as if a vibrating source is moving in upward-downward directions. The control waveform of the eighth embodiment can be combined with the foregoing control waveforms of the other embodiments. Thus, it is possible to render a driver feeling a sensation as if a vibrating source is moving in far-near directions relative to a driver in addition to a sensation as if a vibrating source is moving in a slanted direction, a circumferential direction, or a loop-back direction on a two-dimensional plane in a driver's view.

The eighth embodiment produces the control waveform 105 combining the modulation wave 101, described in the fourth embodiment, with a carrier wave of 50 Hz or 300 Hz and sets a frequency switching time tc=0.5 seconds to the control waveform 105; however, they are not necessarily limited to these values.

As described heretofore, information presentation devices of the present invention are described by way of the first to eighth embodiments with reference to the accompanying drawings; however, the constitution and the operation of the present invention are not necessarily limited to the embodiments, and therefore the present invention may embrace any design choices within the scope of the invention defined in the appended claims.

For example, the fourth embodiment adopts half-period waveforms of sine waves as the modulation waves 101, 111; however, modulation waves are not necessarily limited to these waveforms. As the modulation waves 101, 111, for example, it is possible to employ a triangular wave whose amplitude increases at a constant rate and then decreases at a constant rate. At this time, it is possible to appropriately determine a rate for increasing amplitude and a rate for decreasing amplitude; for example, it is possible to employ a sawtooth wave as a modulation wave.

INDUSTRIAL APPLICABILITY

The information presentation device of the present invention is installed in a vehicle such as an automobile and designed to present various types of information via vibration applied to driver's hands, wherein it is possible to present information, representing the running condition of a vehicle, and external environmental information without causing a driver turning his/her eyes off from the front side in the running direction of a vehicle. Additionally, the information presentation device of the present invention can be installed in any type of machines other than vehicles, for example, wherein it is possible to present various types of information via vibration applied to operators who operate displays such as information terminals, game devices, and virtual reality devices.

REFERENCE SIGNS LIST

10, 20, 30, 40, 50, 60, 70, 80 information presentation device
11, 21, 31 steering wheel
12a to 12g, 22a, 22b, 32a to 32h, 42a, 42b vibrator
13a, 13b, 23a, 23b, 33 switch
14, 24, 34, 44, 54, 64, 74, 84 controller
A1, A2, A21, A22, A31, A32 holding part
B1, B2, B21, B22, B31, B32 vibration transmitter

The invention claimed is:

1. An information presentation device that presents an operator with externally provided information representing an external condition of a vehicle in a form of vibration, said information presentation device comprising:
    a manual control part having a shape held by an operator's hand;
    a plurality of vibrators attached to the manual operation part, each vibrator being a device which is controlled in terms of vibration intensity and frequency independently;
    a controller that generates a driver signal to control the vibrator based on the externally provided information representing the external condition of the vehicle; and
    a vibration transmitter that transmits vibration of the plurality of vibrators, applied to the manual control part, as a tactile stimulus to the operator's hand, as a vibration transfer function inherent to a material of the manual control part,
    wherein the controller sequentially drives the plurality of vibrators with a time difference between vibration start timings.

2. The information presentation device according to claim 1, wherein the manual control part arranges a holding part held by the operator with the vibration transmitter.

3. The information presentation device according to claim 1, wherein the manual control part arranges holding parts, held by operator's hands, at two positions with the vibration transmitter.

4. The information presentation device according to claim 1, wherein the manual control part arranges an operation input part connected to the controller, so that the controller generates the drive signal to control the plurality of vibrators based on the externally provided information and an operation applied to the operation input part.

5. The information presentation device according to claim 4, wherein the holding part of the manual control part arranges the vibration and the operation input part.

6. The information presentation device according to claim 4, further comprising a pointing device as the operation input part.

7. The information presentation device according to claim 1, wherein the manual control part arranges three or more vibrators in a two-dimensional manner.

8. The information presentation device according to claim 1, wherein the controller generates the drive signal, based on a vibration transmission function established between the plurality of vibrators and the vibration transmitter in the manual control part, so as to control the plurality of vibrators.

9. The information presentation device according to claim 1, wherein the manual control part and the vibration transmitter comprise different materials, and wherein the controller generates the drive signal, based on a vibration transmission function established between the plurality of vibrators and the vibration transmitter in the manual control part, so as to control the plurality of vibrators.

10. The information presentation device according to claim 1, wherein the controller generates the drive signal, rendering a frequency-modulated control waveform subjected to frequency sweep over a lapse of time, so as to control the plurality of vibrators.

11. The information presentation device according to claim 1, wherein the controller generates the drive signal, rendering a control waveform multiplexing a plurality of frequency components and changing its mixing ratio with respect to time, so as to control the plurality of vibrators.

12. The information presentation device according to claim 1, wherein the controller controls the plurality of vibrators with different values of vibration intensity.

13. The information presentation device according to claim 1, wherein the controller generates drive signals, rendering amplitude-modulated control waveforms with a time-phase difference therebetween, so as to control the plurality of vibrators.

14. The information presentation device according to claim 1, wherein the controller generates drive signals, rendering control waveforms with a discrete time difference, a time-phase difference, and an amplitude difference therebetween, so as to control the plurality of vibrators.

15. The information presentation device according to claim 1, wherein the controller generates the drive signal based on an externally provided detection signal representing a relative traveling direction and a distance between a plurality of objects.

16. The information presentation device according to claim 1, wherein the manual control part comprises a steering wheel for steering a vehicle.

17. An information presentation device that presents an operator with externally provided information representing an external condition of a vehicle in a form of vibration, said information presentation device comprising:
  a manual control part having a shape held by an operator's hand;
  a plurality of vibrators attached to the manual operation part, each vibrator being a device which is controlled in terms of vibration intensity and frequency independently;
  a controller that generates a driver signal to control the vibrator based on the externally provided information representing the external condition of the vehicle, the controller generating the drive signal, based on a vibration transmission function established between the plurality of vibrators and the vibration transmitter in the manual control part, so as to control the plurality of vibrators, and the controller controls the plurality of vibrators with different values of vibration intensity; and
  a vibration transmitter that transmits vibration of the plurality of vibrators, applied to the manual control part, as a tactile stimulus to the operator's hand as a vibration transfer function inherent to a material of the manual control part.

18. An information presentation device that presents an operator with externally provided information representing an external condition of a vehicle in a form of vibration, said information presentation device comprising:
  a manual control part having a shape held by an operator's hand;
  a plurality of vibrators attached to the manual operation part, each vibrator being a device which is controlled in terms of vibration intensity and frequency independently;
  a controller that generates a driver signal to control the vibrator based on the externally provided information representing the external condition of the vehicle; and
  a vibration transmitter that transmits vibration of the plurality of vibrators, applied to the manual control part, as a tactile stimulus to the operator's hand, as a vibration transfer function inherent to a material of the manual control part, wherein
  the manual control part and the vibration transmitter comprise different materials, and wherein the controller generates the drive signal, based on a vibration transmission function established between the plurality of vibrators and the vibration transmitter in the manual control part, so as to control the vibrators.

* * * * *